(12) United States Patent
Larsson et al.

(10) Patent No.: US 7,545,765 B2
(45) Date of Patent: Jun. 9, 2009

(54) MULTI-USER DIVERSITY FORWARDING

(75) Inventors: Peter Larsson, Solna (SE); Niklas Johansson, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1118 days.

(21) Appl. No.: 10/729,846

(22) Filed: Dec. 8, 2003

(65) Prior Publication Data

US 2004/0233918 A1  Nov. 25, 2004

Related U.S. Application Data

(60) Provisional application No. 60/461,839, filed on Apr. 11, 2003.

(51) Int. Cl.
*H04Q 7/00* (2006.01)
*H04L 12/28* (2006.01)
*H04J 3/16* (2006.01)
*G06F 15/173* (2006.01)

(52) U.S. Cl. .................. 370/328; 370/389; 370/465; 709/238

(58) Field of Classification Search .................. None
See application file for complete search history.

(56) References Cited

U.S. PATENT DOCUMENTS

| | | | | |
|---|---|---|---|---|
| 6,097,703 | A * | 8/2000 | Larsen et al. | 370/254 |
| 6,532,212 | B1 * | 3/2003 | Soloway et al. | 370/230 |
| 6,618,433 | B1 | 9/2003 | Yellin | |
| 6,633,560 | B1 * | 10/2003 | Albert et al. | 370/351 |
| 6,901,046 | B2 * | 5/2005 | Hsu et al. | 370/204 |
| 6,965,568 | B1 * | 11/2005 | Larsen | 370/238 |
| 2002/0051425 | A1 | 5/2002 | Larsson | |
| 2003/0058876 | A1 | 3/2003 | Connor et al. | |
| 2003/0237041 | A1 * | 12/2003 | Cole et al. | 714/776 |

FOREIGN PATENT DOCUMENTS

EP   0455959 A2   11/1991

(Continued)

OTHER PUBLICATIONS

Related U.S. Appl. No. 10/729,835, filed Dec. 8, 2003; Inventor: Peter Larsson et al.

(Continued)

*Primary Examiner*—Brenda Pham
*Assistant Examiner*—Nittaya Juntima
(74) *Attorney, Agent, or Firm*—Nixon & Vanderhye P.C.

(57) ABSTRACT

A higher degree of freedom in the forwarding process can be obtained by investigating which destinations and/or flows that are represented in a transmitting node and selecting relay direction through a wise choice of destination and/or flow. In effect, the forwarding algorithm jointly selects i) a relay node among multiple relay candidate nodes and ii) at least one of a) flow among multiple flows and b) destination among multiple destinations. The transmitting node then selects a set of information heading for a selected destination and/or belonging to a selected flow from the transmit queue, and finally transmits the selected information to the selected relay node. The joint selection process is often based on cost progress, and may be even forward progress in geographic distance. It is however also possible to consider e.g. QoS (Quality of Service) aspects and fairness criteria in the selection process.

46 Claims, 9 Drawing Sheets

FOREIGN PATENT DOCUMENTS

| | | | |
|---|---|---|---|
| EP | 1193921 | A2 | 4/2002 |
| GB | 2369532 | * | 5/2002 |
| WO | 98/56140 | | 12/1998 |
| WO | 0235779 | A2 | 5/2002 |

OTHER PUBLICATIONS

International Search Report.

Seedex: A Mac Protocol for ad hoc networks, Rozovsky et al., Dept of Electrical and Computer Engineering, and Coordinated Science Laboratory, pp. 67-75.

Optimal transmission Ranges and Code Rates for Frequency-Hop Packet Radio Networks, M. Subbarao et al., IEEE Transactions on Communications, vol. 48, No. 4, Apr. 2000, pp. 670-678.

3GPP2 C.S0024, Version 2, Oct. 27, 2000, CDMA 2000 High Rate Packet Data Air Interface Specification, 3$^{rd}$ Generation Partnership Project 2, 3GPP2.

Opportunistic Beamforming Using Dumb Antennas, IEEE Transaction on Information Theory, vol. 48, No. 6, Jun. 2002, Viswanath et al., pp. 1277-1294.

Network Protocols for Frequency-Hop Packet Radios with Decoder Side Information, Pursley et al, IEEE Journal on Selected Areas in Communications, vol. 12, No. 4, May 1994, pp. 612-621.

The DARPA Packet Radio Network Protocols, Jubin et al., Proceedings of the IEEE, vol. 75, No. 1, Jan. 1987, pp. 21-32.

3GPP TS [25.308] V0.1.0 (Sep. 2001), 3$^{rd}$ Generation Partnership Project; Technical Specification Group Radio Access Network; UTRA High Speed Downlink Packet Access; Overall Description; Stage 2, (Release 5), pp. 1-28.

The Spatial Capacity of a Slotted ALOHA Multihop Packet Radio Network with Capture, Nelson et al., IEEE Transactions on Communications, vol. Com. 32, No. 6, Jun. 1984.

Position Based CDMA with Multiuser Detection (P-CDMA/MUD) for Wireless Ad Hoc Networks, Rodoplu et al., IEEE 6$^h$ Int. Symp. on Spread-Spectrum Tech & Appli., Sep. 6-8, 2000.

Scheduling and Performance of Multihop Radio Networks with Mutliuser Detection, Shrader et al., Radio Communications Systems.

Slot Allocations Strategies For TDMA Protocols in Multihop Packet Radio Network, Chou et al., 1992 IEEE.

Translation of Russian official action dated Jan. 22, 2008 in corresponding Russian Application No. 2005134955/09(039073).

* cited by examiner

MULTI-USER DIVERSITY FORWARDING

This application claims the benefit of U.S. Provisional Application No. 60/461,839 filed 11 Apr. 2003, the entire contents of which is incorporated herein by reference.

TECHNICAL FIELD

The present invention generally relates to communication networks, and more particularly to multi-hop networks and a routing mechanism for such networks.

BACKGROUND

Protocols for sharing a wireless medium effectively among multiple users are generally denoted multiple access protocols, channel access schemes or medium access schemes. Multiple access protocols may as described in [1] be divided in two main categories: conflict-free protocols and contention-based protocols.

Conflict-free protocols are protocols ensuring that a transmission, whenever made, is successful, i.e. not interfered by other transmissions. Conflict-free transmission can be achieved by allocating the channel to the users either statically or dynamically. This is often denoted fixed and dynamic scheduling respectively. The benefit of precise coordination among stations is that it is believed to provide high efficiency, but comes at the expense of complexity and exchange of sometime large quantities of control traffic.

Contention-based protocols differ in principle from conflict-free protocols in that transmissions are not guaranteed to be successful. The protocol should therefore prescribe a procedure to resolve conflicts once they occur so that all message are eventually transmitted successfully.

Multiple access protocols can also be divided based on the scenario or application for which they have been designed. Some protocols are suitable for access towards/from a single station, e.g. a base station in a cellular system, whereas other protocols are designed to operate in a distributed environment. An important distinction for the distributed case is whether the protocol is designed primarily for a single hop case, i.e. communication only with a designated neighbor within reach, or if it is particularly designed for a multi-hop scenario.

In a multi-hop scenario, information may be transmitted over multiple hops between source and destination instead of directly in a single hop. In general, the multi-hop approach offers several advantages such as lower power consumption and higher information throughput compared to a direct one-hop approach. In a multi-hop network, nodes out of reach from each other can benefit from intermediately located nodes that can forward their messages from the source towards the destination. Multi-hop networks can be so-called ad hoc networks where nodes are mostly mobile and no central coordinating infrastructure exists, but the idea of multi-hop networking can also be applied when nodes are fixed.

In prior art routing techniques based on an underlying shortest-path routing protocol (such as Bellman-Ford based routing), a well-defined multi-hop route from source to destination is determined based on routing cost information passed through the system. Simplified, each node or station knows the costs of its outgoing links, and broadcasts this information to each of the neighboring nodes. Such link-cost information is typically maintained in a local database in each node and based on the information in the database, a routing table is calculated using a suitable routing algorithm. In general, shortest path and similar routing techniques lead to the existence of a single route for each source-destination pair. A very simple shortest-path based routing scheme, though not the most efficient, may for example use the well known ALOHA contention-based multiple access protocol.

There are existing protocols (which may use an underlying shortest-path protocol) based on the concept of exploiting multiple nodes in the forwarding process with a more or less active routing choice. For example, the protocol called EIGRP (Enhanced Interior Gateway Routing Protocol) [2] is a routing protocol, used mainly in a fixed network that allows random-based forwarding to one out of several routers. Random-but-forward routing [3] by Sylvester and Kleinrock is similar to EIGRP, i.e. random-based forwarding of packets to one out of several packet radio network routers, but it also includes an important amendment; it is ensured that a packet is always heading in the general correct direction. Alternate path routing [4] by DARPA (Defense Advance Research Project Agency) allows a packet that is retransmitted over a link to be duplicated while multicasted to several nodes from which the packet again follows a shortest path routing approach. Primary N/M-forwarding [5] is based on the idea that a node tries to send a packet at most N times to a node and then, if failing, it tries the next node up to N times. This procedure is repeated for at most M nodes prior to dropping the packet. The advantage of alternate path routing and primary N/M-forwarding is that they can adapt to the local communication situation, including congestion and temporarily poor communication due to e.g. fading or interference fluctuations.

Changes or fluctuations within the system over time can create windows or peaks of opportunity that enable signal transmissions to be more successful than at other times and conditions. Plain shortest-path techniques and associated prior art routing techniques do not have the ability to recognize these windows of opportunity, since there is no relative information stored by each node or station. In contrast, opportune routing [6, 7] exploit to some extent the opportunities that system changes and fluctuations provide. In the context of wireless routing in particular, overall system performance is degraded when link quality varies rapidly over time (e.g. due to Rayleigh fading). However, opportune routing partly mitigates this performance degradation by making use of the windows of opportunity that these fluctuations provide. With opportune routing, there is not a single route for each source-destination pair, i.e. similar to EIGRP, random-but-forward and to some extent also alternate path routing and primary N/M-forwarding. Instead, data packets follow a route that is somewhat random, while still leading from source to destination. Consequently, when a shortest-path procedure is used, consecutive packets will generally be sent over the same route, whereas when opportune routing is used, consecutive packets may be routed over different paths but in the same direction.

However, die general monitoring in [6, 7] is a slow process. Monitoring is either handled by listening on bypassing messages or by occasionally sending out so-called probes. When a probe is sent out, a response that includes information on for example path loss is expected back. When there is a delay between the probe and data transmission, then the returned input information for the forwarding algorithm may become obsolete by the time the data is transmitted. A particularly undesirable consequence is that existing opportune routing, and also plain shortest-path based routing techniques, do not handle possible diversity effects efficiently.

Selection diversity forwarding (SDF) [8] is a technique for efficiently handling diversity effects in a near optimal manner. This novel approach is based on directing transmission from an originating station to a group of receivers or relay nodes nearby. When one or more of the receiving nodes have replied, one of the replying nodes is selected and a command message is transmitted to the selected relay node instructing it to assume responsibility for forwarding the data message. The process is repeated for all subsequent responsible nodes until the information reaches the destination. By following this approach, both branch diversity and capture effects can be exploited in the data forwarding process. In particular, branch diversity reduces the need to use interleaved data together with coding to combat fading channels, which in turn means smaller delay and consequently higher throughput. The capture effect refers to a phenomenon in which only the stronger of two signals that are at or near the same frequency is demodulated, while the weaker signal is suppressed and rejected as noise. In conjunction with multiple receiving stations, the capture effect provides a high degree of robustness when data transmissions collide. SDF utilizes a slow underlying cost protocol, but allows instantaneous adaptation to fast channel fluctuations per se.

Similar ideas for exploiting fluctuations, but for normal cellular networks with single hops, can be found in [9, 10 and 11], which refer to High Speed Downlink Packet Access (HSDPA), High Data Rate (HDR) and Opportunistic Beamforming (OB), respectively. HSDPA and HDR are very similar to each other. Opportunistic Beamforming however is different from a functional point of view in that OB randomly points, or continuously sweeps an antenna beam, in different directions, whereas HSDPA and HDR has no notion of beamforming. In particular, Opportunistic Beamforming [11] exploits the opportunistic idea and then utilizes the opportunistic approach with respect to beamforming to enhance system capacity in a cellular system or at a base station. However, the concept of HSDPA, HDR and OB as such does not relate to multi-hopping. OB is essentially an extension of fast scheduling at the base station taking fast channel fluctuations into account, which has been suggested both for CDMA 2000 HDR and WCDMA HSDPA.

SUMMARY

The present invention overcomes these and other drawbacks of the prior art arrangements.

It is a general object to provide an efficient mechanism for forwarding information in a multi-hop network.

It is an object to improve the performance of a multi-hop network with regard to throughput, delay characteristics and/or power consumption.

It is also an object to improve Quality of Service (QoS) support in the network.

Another object concerns improvements with regard to load distribution.

It is a particular object to provide a method and system for efficient forwarding of information in a multi-hop network.

It is also an object to provide a communication node supporting efficient forwarding of information in a packet radio multi-hop network.

Another object is to provide a control node supporting efficient forwarding of information in a packet radio multi-hop network.

These and other objects are met by the invention as defined by the accompanying patent claims.

A higher degree of freedom in the forwarding process can be obtained by investigating which destinations and/or flows that are represented in a transmitting node and selecting relay direction through a wise choice of destination and/or flow. In effect, the forwarding algorithm proposed by the invention jointly selects i) a relay node among multiple relay candidate nodes and ii) at least one of a) flow among multiple flows and b) destination among multiple destinations. The transmitting node then selects a set of information heading for a selected destination and/or belonging to a selected flow from the transmit queue, and finally transmits the selected information to the selected relay node.

In this way, selection among more relay nodes is effectively enabled compared to the situation of simply selecting a suitable relay node for the first packet at the head of the transmit queue. The main reason for this added degree of freedom lies in the fact that different packets, or more generally different sets of data, may be heading in various directions from the transmitting node, thus enabling selection of relay node in several general forwarding directions. The selection is often based on cost progress, and maybe even forward progress in geographic distance. It is also possible to consider QoS (Quality of Service) aspects in the selection process, since for example different flows may have different QoS requirements. By way of example, a flow with strict delay requirements may then be prioritized higher than a flow with more relaxed delay requirements. Fairness between destinations and/or flows is another aspect that may be considered in the selection process. Anyway, the selection of destination/flow ultimately translates into a selection of information to be transmitted from the transmit queue.

For further improvement, it is proposed to jointly select a combination of destination/flow, relay node as well as one or more link parameters for transmission/reception of data. This means that the invention allows for selection among relays for multiple packets, while simultaneously adapting link parameters, such as link mode, frequency channels or sub-carriers, transmit power and/or antenna weights) for optimal communication. The link parameters may generally be selected from DLC (Data Link Control) parameters on the data link layer as well as underlying physical PHY layer parameters.

The selection process in which different destinations/flows, relay nodes and optionally also link parameters are jointly considered, is normally based on information representing link performance between the transmitting node under consideration and each one of the relay candidate nodes. For this reason, communication is preferably divided into three or four phases, an interrogation phase, a response phase, a data phase and an optional acknowledgement phase. The two initial phases are typically designed to inquire and retrieve link performance information such as channel and transmission information in relation to each one of the relay candidate nodes, e.g. through the report of expected signal-to-noise ratio (SNR) or signal-to-noise+interference ratio (SINR), or alternatively by indicating a supported transmission rate. The SINR includes both interference and noise, and is therefore often preferred. Once a selection of destination/flow, relay node and a suitable set of data from the transmit queue is completed with or without integrated link adaptation, the data is transmitted to the relay node in the data phase. If desired, the selected relay node may acknowledge reception of data in the acknowledgement phase. Preferably, the above three or four phases are performed within a period of time that has a shorter duration than the channel coherence time to allow for fast adaptation. Other acknowledgement schemes may also be used. For example, acknowledgements may deliberately be delayed and collected in an aggregate acknowledgement message that is sent less frequently (an acknowledgement does not necessarily have to be within the coherence time).

It is desirable to jointly select destination/flow, relay node and optional link parameters that are optimal in some sense. In order to be able to speak about optimality in a well-defined manner, an objective function based on quality cost progress or information cost progress is preferably introduced and optimized with respect to destination/flow, relay node and optional link parameters. For example, the above scheme allows an objective function to be defined and optimized for instantaneous SNR/SINR situations, e.g. to provide maximization of throughput and minimization of delay.

If multiple flows are supported for some destination(s), the selection may then be a combination of flow and destination. If destination is used as optimization variable instead of flow, the selection result will include a selected relay node and destination. However, there may be several flows to the selected destination and it is thus still an open question as to which flow to select. Of course, an additional separate selection among these flows may be performed, e.g. based on QoS requirements or even randomly. However, by using flow as an optimization variable, QoS aspects may be integrated directly into the joint optimization process, resulting in the selection of an optimal flow both from destination direction point of view and QoS point of view.

It should be understood that the joint selection process may be performed directly by the transmitting node under consideration or by an associated control node responsible for one or more transmitting nodes.

In a preferred realization, the transmitting node transmits an interrogation message to multiple relay candidate nodes in the network. The relay candidate nodes may for instance be selected based on multi-hop cost information obtained from an underlying route determination protocol, perhaps together with additional information. Each relay candidate node then replies, in response to the interrogation message (provided that it was received), with a response message either to the transmitting node itself or to a control node responsible for the transmitting node. The joint selection process is then performed, either by the transmitting node itself or by the control node, based on the response messages from the relay candidate nodes. Preferably, each relay candidate node determines link performance representing information for the corresponding link between the transmitting node and the relay candidate node based on the received interrogation message, and replies with this link performance information. Alternatively, the transmitting node itself determines link performance information based on the received response message from the candidate node, assuming link reciprocity (and having some notion of noise plus interference characteristics at the relay node).

In a fully centralized architecture, cost information, information on which destinations/flows that are represented in the respective transmitting nodes as well as relevant link performance information are transmitted to a central control node, which may then perform selection of destination/flow, relay node, and optional link parameters for each of the transmitting nodes in the multi-hop network. Apparently, the central control node has to transfer information on selected destination/flow and relay node and optional link parameters to the respective transmitting nodes.

Normally, the transmitting nodes in the multi-hop network, or at least a sub-set of transmitting nodes, are operated for time-synchronized transmission of interrogation messages as well as time-synchronized transmission of data. It is also important that the SNR/SINR or other link performance indicator reported during the interrogation response phase remains the same (or is improved) over the whole data phase.

Therefore, each interrogation message is preferably transmitted using one or more predetermined transmit parameters such as transmit power level and/or antenna weights. During the subsequent data phase, substantially the same transmit parameter or parameters are then typically re-used for transmitting the selected data. In this way, the SNR/SINR may e.g. be improved if some node decides not to transmit, but can generally not be worsened.

It has been recognized that the invention can also be combined with and adapted to handle multi-user detection on the receiver side. In this case, a receiving node that receives interrogation messages from multiple transmitting nodes generally determines link performance information such as SNR/SINR or rate information for each link. In a practically feasible implementation, the receiving node simply replies only to node(s) that is/are associated with high performance link(s).

The technology described offers the following advantages:
Efficient multi-hop forwarding;
Increased network performance;
Increased throughput and/ or reduced delay,
Possibility to carry higher traffic load while retaining performance criterions, such as throughput and delay, at a constant level;
Reduced power consumption for the same performance level as other schemes;
Increased degree of freedom enabled by the joint selection of relay node, destination/flow and possibly also link parameters;
In particular, the increased degree of freedom leads to a relatively larger number of potential relay or forwarding nodes to choose among;
a Whenever QoS aspects are included, one may expect improved QoS performance through the increased degree of freedoms to perform QoS prioritizations;
a Reduced risk of congestion and buffer overflow;
Improved flow control; and
High cost progress.

Other advantages will be appreciated upon reading of the below description of the example and non-limiting embodiments.

DETAILED DESCRIPTION

Figure 1:
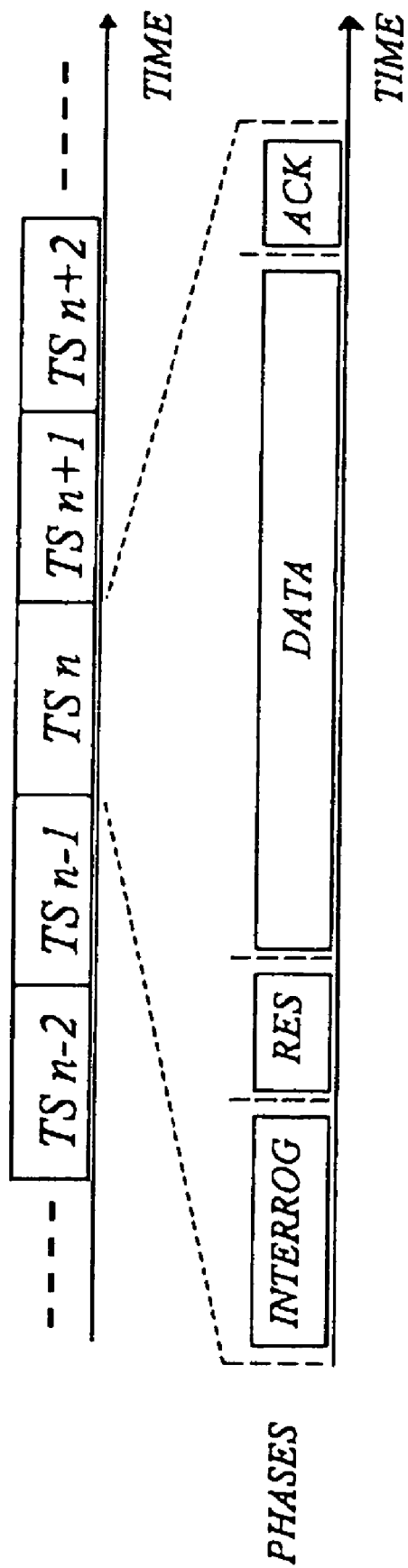
FIG. 1 is a schematic diagram illustrating an exemplary four-phase communication scheme according to a preferred example embodiment.

Throughout the drawings, the same reference characters will be used for corresponding or similar elements.

The technology relates to multi-hop networks such as packet radio multi-hop networks, and more particularly to a novel forwarding scheme for multi-hop networks called multi-user diversity forwarding (denoted MDF).

The MDF scheme proposed by the invention can be used together with any underlying route determination protocol such as a shortest path protocol that generates routing cost tables or a route determination protocol more customized to diversity forwarding. Naturally, the invention may be arranged in association with other network-related functions such as topology control mechanisms.

The multi-user diversity forwarding (MDF) scheme proposed by the invention integrates aspects on at least two of the three lowest protocol layers. Typically, these three layers refer to the OSI (Open System Interconnect) model and include the physical layer, the link layer and the network layer.

At the core, we find a forwarding algorithm that investigates which destinations/flows that are represented in the transmitting node and selects relay direction through a wise choice of destination/flow. The forwarding algorithm jointly selects i) a relay node among multiple relay candidate nodes and ii) depending on application and desired degree of flexibility in the optimization at least one of a) destination among multiple destinations and b) flow among multiple flows, preferably together with iii) one or more link parameters. In conjunction thereto, a set of information for transmission, such as a data packet, is selected from the transmit queue based on selected destination and/or flow. This may be a set of information destined for a selected destination and/or a set of information belonging to the selected flow. The selected data is finally transmitted to the selected relay node, which takes on responsibility for further forwarding of the data in the multi-hop network (unless it is the destination). Naturally, if the selected candidate node is the destination node, the destination node does not forward the information any further. In its most elaborated form, the invention thus allows for selection among relays for multiple packets, while simultaneously adapting link parameters for optimal communication.

The technology will now be described by way of example. In addition to information on which flows and/or destinations that are represented in the transmitting node and cost information from an underlying route/cost determination protocol, the selection process is normally based on information representing link performance between the transmitting node under consideration and each one of the relay candidate nodes. For this reason, communication is preferably divided into three or four phases, an interrogation phase, a response phase, a data phase and an optional acknowledgement phase, as schematically illustrated in FIGS. 1 and 2.

The above three or four phases preferably take place within a time slot or other period of time that has a shorter duration than the channel coherence time, and the timeslots are repeated consecutively after each other. Note that the phases may optionally be ordered to span other arrangements than a single timeslot. In this case, however, at least the first phase and the third phase should preferably experience a stable channel (i.e. within the coherence time of the channel) and the same (or very similar) interference situation. The focus in the following will however be on the four-phase protocol within a timeslot, but not limited thereto.

The two initial phases are typically designed to inquire and retrieve link performance information such as channel and transmission information in relation to each one of the relay candidate nodes, e.g. through the report of expected SNR/SINR or alternatively by indicating a supported transmission rate. Once a selection of destination/flow, relay node and a suitable set of information from the transmit queue is completed with or without integrated link adaptation, the information is transmitted to the relay node in the data phase. If link adaptation is used, a suitable link mode and/or other link parameters are selected based on the reported SNR/SINR or rate prior to transmission of the data. If desired, a selected relay node may acknowledge reception of data in the optional acknowledgement phase. Instead of reporting SNR/SINR, an optimal rate (link mode) could alternatively be reported directly, as previously mentioned.

Figure 2:
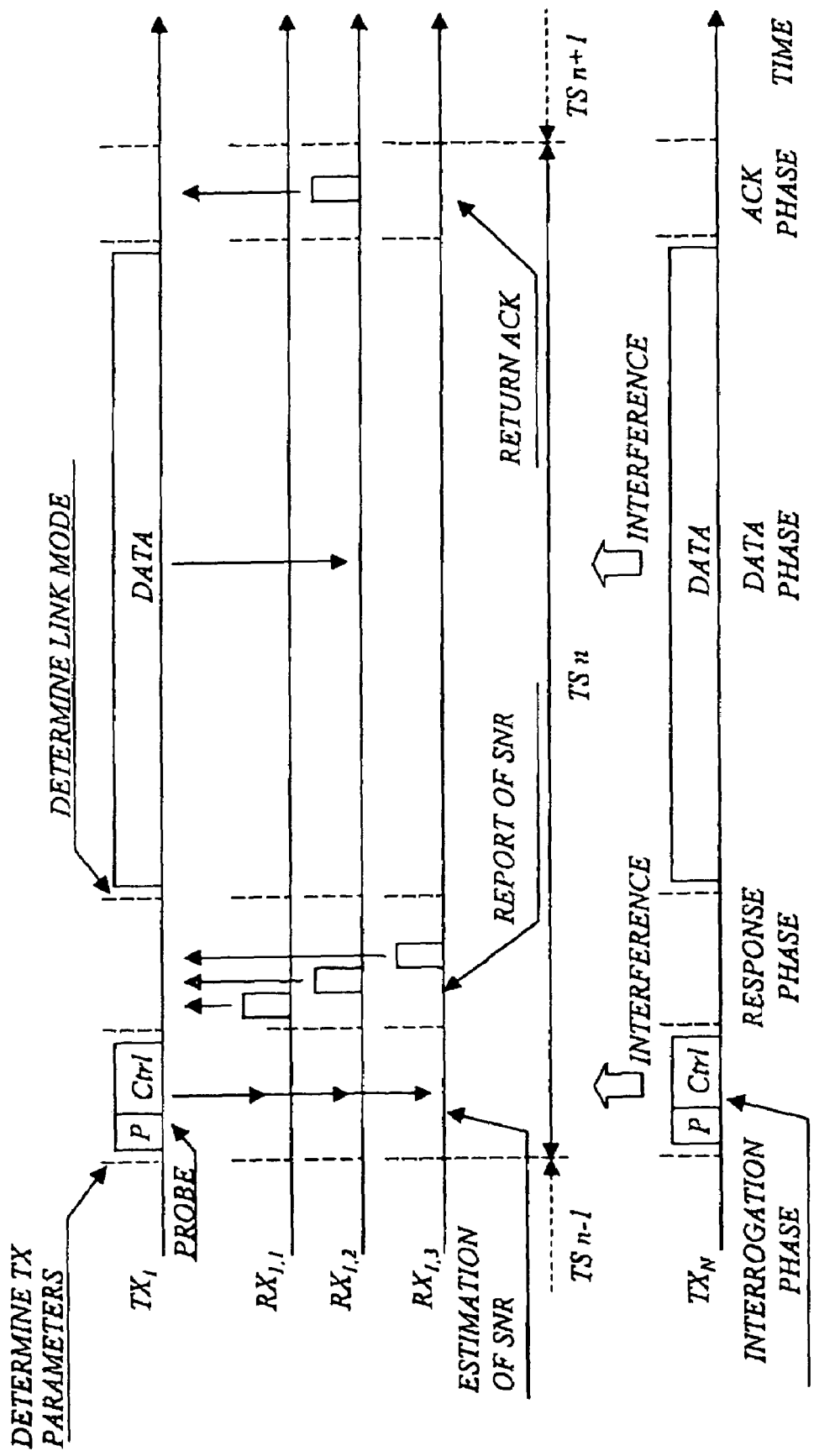
FIG. 2 is a schematic diagram illustrating an example of a four-phase scheme with synchronized transmission of time slots in a multi-hop network according to a preferred example embodiment.

FIG. 2 illustrates an example of a four-phase scheme involving a number of transmitting nodes and a number of potential receiving nodes. The scheme is shown for a number of transmitting nodes $TX_1$ to $TX_N$, where each transmitting node transmits an interrogation message to a number of potential receiving nodes. For simplicity, only receiving nodes $RX_{1,1}$, $RX_{1,2}$ and $RX_{1,3}$ for transmitting node $TX_1$ are shown in FIG. 2. Each receiving node estimates the SNR/SINR and reports the estimated SNR/SINR to the corresponding transmitting node, which then selects a combination of destination/flow, relay node, and optional link mode for transmission of data to the selected relay node. Based on the selected destination/flow, the transmitting node extracts a set of information from the transmit queue, and finally transmits the data in the data phase.

In order to ensure substantially the same interference conditions during both the interrogation phase and the subsequent data phase, the transmitting nodes should preferably transmit their frames in a time-synchronized manner, and substantially the same transmit power level and/or antenna weights should be used during both phases. As indicated in FIG. 2, the transmitting nodes $TX_1$ to $TX_N$ transmit their frames in such a way that the time slots are time-aligned. This provides a basis for correlation between the interrogation phase and the data please. In addition, one or more transmit parameters such as transmit power level and/or antenna weights are initially determined and used both during the interrogation phase and the data phase so that the SNR/SINR reported during the interrogation response phase remains the same (or is improved) over the whole data phase.

For example, if node $TX_i$ in a multi-hop network has decided to transmit in timeslot n, it may select a transmit power $P_i$ for the subsequent data transmission. The transmit power $P_i$ may or may not, depending on choice, be allowed to vary from transmission to transmission, (where the non-varying case is treated as a special case of the varying case). For instance, $P_i$ may, and preferably should reflect topology changes and depend on transmit buffer content, previous failed transmissions and/or QoS factors. It is also possible to allow some nodes to adopt a low or alternatively high power approach, depending on whether power consumption or performance is the most relevant factor for the node in question. In addition, other transmit parameters apart from transmit power may be selected, such as antenna weights, allowing certain sets of potential relaying nodes to be targeted. Information on potential relay nodes may be derived from earlier derived topology information but may also be influenced by transmit buffer content, previous failed transmissions and QoS factors. The decision to transmit requires that packets are waiting in the transmit buffer, and may also depend on the medium access principle that has been adopted, e.g. slotted ALOHA with randomly drawn transmit instances.

In order to enable the receiving candidate nodes to identify which node that sent the interrogation message, an explicit address may be appended to the message or a locally unique word (used for correlation by the receiver).

The interrogation phase may adopt different methods, wherein a first exemplary method is based on the idea that each transmitting station or node transmits an interrogation message at transmit power $P_i$. A receiving node $RX_{ij}$ may then identify the node that sent the interrogation message and at what power level it was received.

In a second exemplary interrogation phase method, the transmitter address is included in the interrogation message. The interrogation messages from various transmitting nodes are subsequently transmitted in such a way that they are preferably (locally) non-colliding, e.g. through support of a suitable collision-free protocol. In addition, each message conveys information of transmit power level $P_i$ to be used for subsequent data transmission. Based on this information, similar to the first interrogation phase method, a receiving node $RX_{ij}$ may identify which node that sent the interrogation message and at what power level a subsequent data packet is expected to be received. If desired, method two interrogation messages may also contain information of desired receiver nodes or stations.

Note that the interrogation message in the second method may be sent on a different (generally higher) power level compared to the power level for the data message, provided that an appropriate offset indication is included in the interrogation message or that the offset is implicitly known beforehand. This provides an SNR improvement for the interrogation message phase, and also offers a greater flexibility.

In the following we will focus on the second method due to its greater flexibility.

In the response phase, each node sends a response message, preferably including SNR/SINR information. In an alternative embodiment, each candidate node determines which rate that can be used for reception (as channel frequency selectivity may easily be incorporated in the decision), and then responds with the rate instead.

The rate may be an explicit value or an implicit code for some combination of modulation (QSPK, 8PSK, 16QAM, . . . ) and forward error correcting code (convolutional coding, Turbo coding, . . . ) and encoding rates. In a further alternative embodiment, the channel estimate is returned, enabling more efficient rate or link mode selection at the transmit side. For frequency division schemes such as Orthogonal Frequency Division Multiple Access (OFDMA), a frequency-dependent SNR/SINR representation may be returned, enabling efficient selection of a sub-carrier (frequency channel) or a set of sub-carriers for a user.

In the following, we assume the SNR/SINR reporting for brevity. The precise way in which SNR/SINR is reported depends on the type of detector used at the receiver. In a first case, single user detection is deployed and in a second case multi-user detection (MUD) may be used. If the receiver side uses the single user detection method, then the determined SNR/SINR is sent together with the address to which the SNR/SINR belongs. If MUD receivers are exploited, then a vector of SNR/SINR values with the associated transmitters may be conveyed. The SNR/SINR is then defined as receive power level to the sum of noise and the power of all weaker interfering signals for the signal of interest (see Appendix). For the single user detector case, the SNR/SINR is defined as the strongest received signal to the sum of power of interfering signals and noise. Rather than indicating SNR/SINR levels, explicit power levels may naturally be indicated instead together with an indication of the noise level. The responses are preferably sent, such that local collisions are avoided, by means of a suitable collision free protocol.

Based on for example the SNR/SINR levels or returned rate information in the responses, each transmitter now perform two or preferably three decisions in a joint process (if MUD receivers are exploited then this shall also be considered in the decision process):

selecting destination/flow, and based thereon which packet or more generally which set of information in the queue to transmit,
  selecting which relay node that will receive the packet and forward (unless it is the destination station) it, and
  optionally deciding which additional link parameters apart from the predetermined transmit power level to use. Preferably, the additional link parameters include link mode parameters such as data signal constellation and forward error correcting coding, but may also include for example frequency channel parameters. If additional link parameters can not be selected, only the first two steps are executed.

For rate or link adaptation, the transmitter may also include more exact channel state knowledge, either returned in the response message or an estimation of the channel when the response message is received, assuming channel reciprocity is a valid assumption.

In the data phase, the selected packet is transmitted to the determined relay node using the assigned link and transmit parameters.

In the acknowledgement phase, the receiving node responds with an acknowledgement indicating whether the packet was received correctly or not.

In the above, semi-stationary conditions over at least one timeslot are assumed as well as reasonably good accuracy of relative measurement and transmit power settings.

It should be noted that, for interrogation method two, multiple consecutive interrogation packets can be transmitted in the interrogation phase. In the same way, multiple response messages can be transmitted in the response phase as well as multiple acknowledgements in the acknowledgement phase.

Figures 3A, 3B:
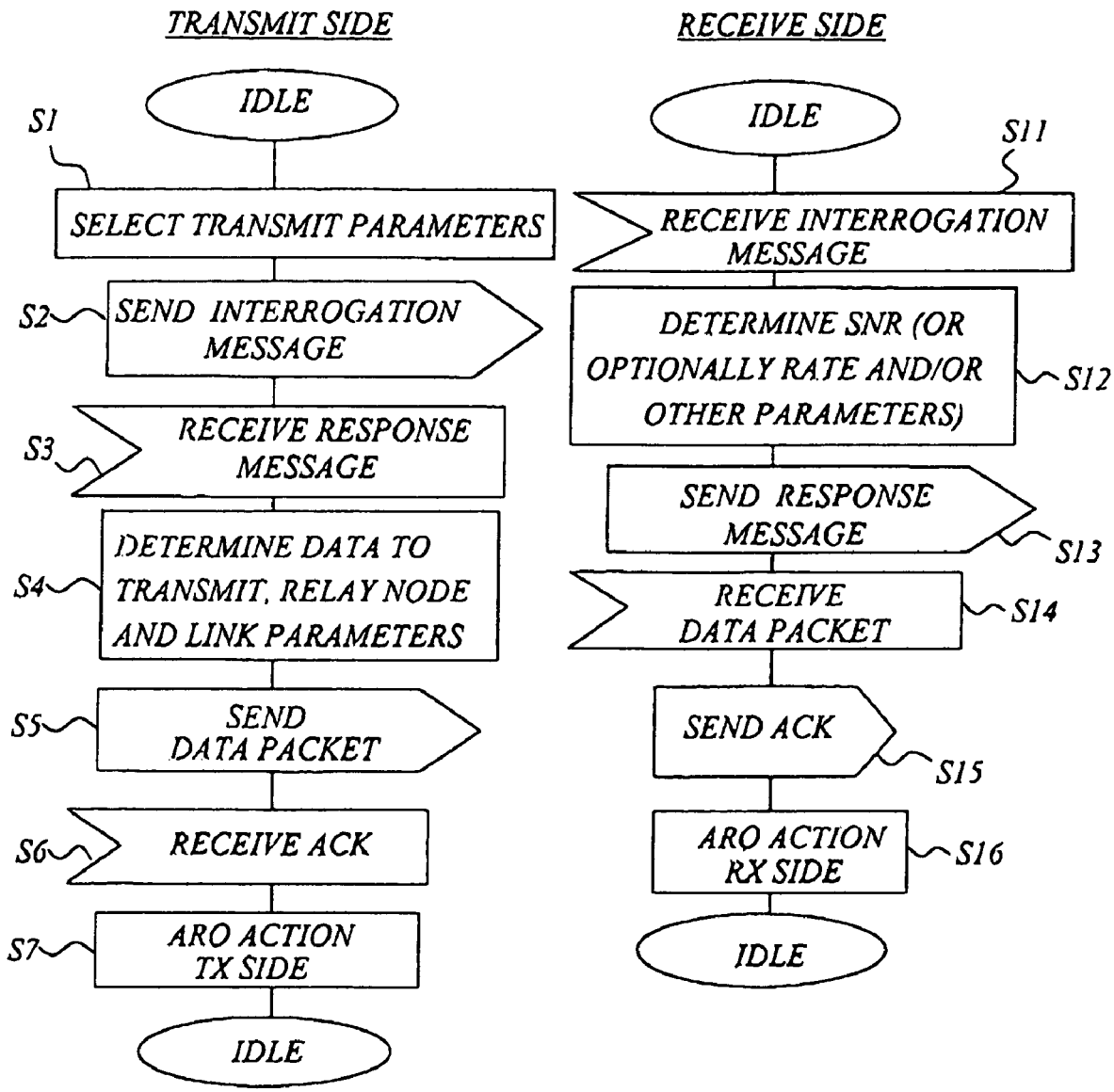
FIGS. 3A-B are schematic flow diagrams of an exemplary forwarding method according to a preferred example embodiment on the transmitter side and receiver side, respectively.

FIGS. 3A-B outline the principles of an exemplary forwarding method according to a preferred embodiment of the invention on the transmitter side and receiver side, respectively. The principles will now be outlined briefly, starting on the transmit side.

One or more suitable transmit parameters such as transmit power and/or antenna weights are initially determined in step S1. In step S2, an interrogation message is sent, typically by means of broadcasting or multicasting. In step S3, a corresponding response message, including e.g. SNR/SINR or rate information, is received from one or more potential relay nodes. In step S4 the joint selection process is performed to determine which data to transmit as well as relay node and link parameters. In step S5, a data packet heading for a selected destination or belonging to a selected flow is transmitted to the selected relay node using the initially determined transmit parameters and the selected link parameters. In step S6, an acknowledgement is received. In step S7, possible ARQ actions may be performed.

On the receive side, the interrogation message is received in step S11. In step S12, a SNR/SINR value, supported rate or other suitable parameter is determined in response to the received interrogation message. In step S13, the SNR/SINR or rate is reported to the transmitting node in a response message. If the relay node has been selected by the transmitting node, a data packet is received in step S14. In step S15, an acknowledgement is sent to the transmitting node indicating that the packet was correctly received. Possible ARQ actions are taken on the receive side in step S16.

As the ARQ (Automatic repeat Request) scheme may be selected from a range of ARQ schemes, the ARQ details are not indicated. The basic function is to ensure that a packet is retransmitted until a positive acknowledgement is received (though, an upper limit of the number of retransmissions may be employed) and then the packet may optionally be removed from the transmit buffer. The ARQ functionality may have functions on the transmit side as well as on the receive side as customary.

Of course, other transmit parameters than transmit power may be used by the invention, for example antenna weights Also, it should be understood that rate or link adaptation is an optional, but often preferred feature.

Apart from an opportunistic choice among multiple relay nodes, which is similar to SDF proposed in [8], the invention gives at least two additional main benefits.

The first comes from the opportunity to choose among multiple packets (and hence flows/destinations) present in the transmit buffer. The main reason for this added degree of freedom lies in the fact that different packets (or more generally different sets of data) may be heading in various directions from the transmitting node, thus enabling selection of relay node in several general forwarding directions.

Figures 4A, 4B:
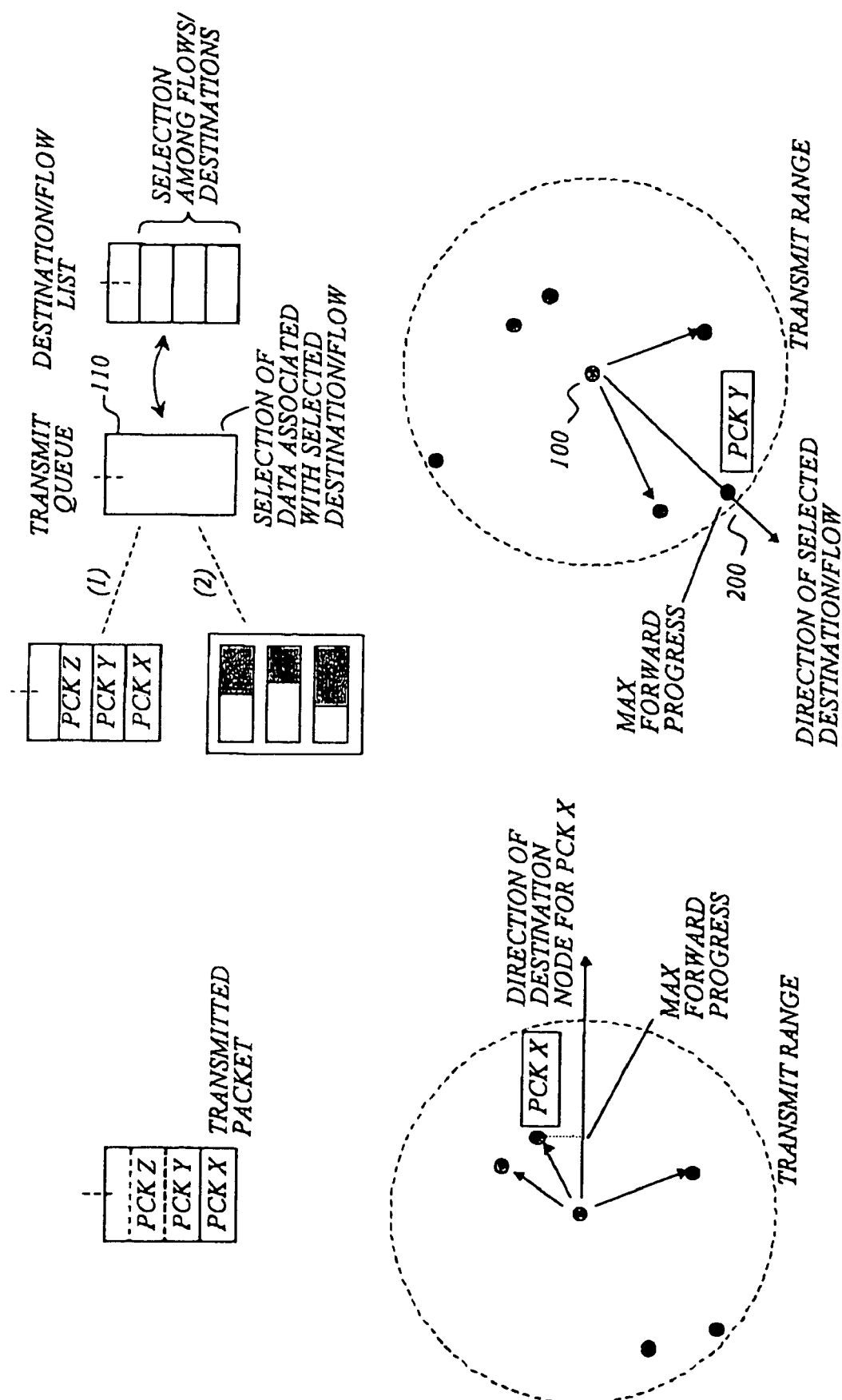
FIG. 4A illustrates the selection of relay node according to the prior art.
FIG. 4B illustrates the selection of destination/flow and relay node according to an example embodiment.

This benefit is easily appreciated from FIGS. 4A-B with a simple geographic-based forward progress metric, where FIG. 4A shows the SDF method proposed in [8] and FIG. 4B shows the method according to an exemplary embodiment of the invention.

In the prior art of FIG. 4A, the first packet PCK X in the transmit queue is the packet to be transmitted. This packet belongs to a given flow and is destined for a given destination node, which then determines the general forwarding direction for packet PCK X. The transmitting node selects among a number of potential relay nodes that give a forward progress in this general direction. The transmitting node typically transmits the packet to the relay node with maximum forward progress, here simply meaning that the packet is transported the longest projected distance in the direction of the destination node of the packet.

In the technology described, it is possible to select relay node in all destination/flow directions of the packets represented in the transmit queue 110 of the considered transmitting node. For example, the transmit queue may be packet-based (1) with different packets ready for transmission. Alternatively, the transmit queue comprises a number of buffers (2), each buffer holding data for a given destination or flow. In the second alternative, data from the various buffers are later encapsulated into packet form, once a suitable link mode scheme has been selected. The transmitting node 100 maintains a list of destinations/flows currently represented in the node, thus allowing selection among the different destinations/flows. This in effect enables selection of relay node in several general forwarding directions. From FIG. 4B, it can be seen that packet PCK Y is destined for a destination in a completely different direction than packet PCK X. In this direction, there is a relay node 200 that gives an absolute maximum forward progress, close to the transmit range of the transmitting node 100. From a forward progress point of view, it is thus clearly more advantageous to transmit packet PCK Y than PCK X.

In addition, it is also possible to consider for example QoS (Quality of Service) aspects, since for example different flows may have different QoS requirements, as well as fairness between destinations and/or flows. The selection of destination/flow ultimately translates into a selection of data from the transmit queue. It is hence possible, based on what transmissions that are perceived to succeed, to opportunistically determine the most optimum packet to send.

A second main benefit of the invention is that link performance can be optimized, in conjunction with selection of which packet to transmit and which relay node to use.

In order to be able to speak about optimality in a well-defined manner, it is desirable to introduce an objective function $f$. In general, the objective function $f$ is carefully selected and made dependent on a) some given input parameters characterizing the (wireless/radio) multi-hop network, and b) some variables that can be carefully selected to optimize the objective function $f$.

In this particular example, the multi-hop network is characterized in that each relay node has at least an associated cost towards at least one destination. Other information such as local load, queuing status, Quality of Service (QoS) requirements or remaining battery, could also be incorporated into the objective function.

The optimization variables include at least relay node and flow and/or destination. If multiple flows are supported for some destination(s), the selection may then be a combination of flow and destination. If destination is used as optimization variable instead of flow, the selection result includes a selected destination, but there may be several flows to the selected destination and it is thus still an open question as to which flow to select. Of course, an additional separate selection among these flows may be performed, e.g. based on QoS requirements or even randomly. However, by using flow as an optimization variable, QoS aspects may be integrated directly into the joint optimization process, resulting in the selection of an optimal flow both from destination direction point of view and QoS point of view.

In addition, rate may if desired be included as a variable. Rates are then determined by any appropriate combination of modulation, coding and spreading scheme. Moreover, given that an optimum rate has been selected, it is allowed for the transmitting node to (only) reduce it's transmit power if the link SNR/SINR exceeds what is needed for the selected optimum rate. We generally call parameters such as modulation, coding and spreading scheme, transmit power, antenna weights and frequency channel parameters for link parameters. The term "link parameters" thus includes DLC (Data Link Control) parameters on the data link layer as well as underlying physical PHY layer parameters. The DLC parameters include both LLC (Logical Link Control) parameters and MAC (Medium Access Control) parameters, and hence a link parameter may be selected from LLC, MAC and PHY parameters.

The output from the objective function includes a selected relay node and a selected destination or flow to a destination. The selection of destination or flow affects which information that is sent. In addition, the optimization of the objective function can also provide an appropriate combination of modulation, coding and spreading scheme, i.e. rate selection, as well as an appropriate set of sub carriers or frequency channels to be used. As a result of the rate selection, a reduction in transmit power is yet another and additional output.

When formalizing an optimization considering relay node, flow and link parameters, the following notations may be used:

V denotes the set of all nodes in the network (or the considered part of the network).

$J_i$ is the set of candidate relay nodes, i.e. nodes responding to node $v_i$:s probe, $v_i \in V$.

$\Phi_i$ is the set of flows in node $v_i$, $v_i \in V$.

$\psi$ denotes one or a multitude of link parameters, and may thus be multidimensional with respect to link parameters, each variable parameter as such having a definition space in which it may assume continuous or discrete values. The link parameter can depend on the transmitter $v_i$, $v_i \in V$ and receiver $v_j$, $v_j \in V$ nodes, then $\psi$ is denoted $\psi_{ij}$.

The objective function $f$ is then optimized for forwarding on behalf of node $v_i$, using input parameters from the above sets $J_i$, $\Phi_i$ and $\psi$ to jointly determine an optimal combination of relay node $\tilde{J}$, flow as well as link parameters:

$$\tilde{J}, \tilde{\Phi}, \tilde{\Psi} = \arg_{J_i, \Phi_i, \Psi} \left( opt_{(J_i, \Phi_i, \Psi)} \{f\} \right)$$

where:

$\tilde{J}$ defines the chosen relay node:

$$\tilde{J} = \arg_{J_i} \left( opt_{(J_i, \Phi_i, \Psi)} \{f\} \right)$$

$\tilde{\Phi}$ defines the chosen flow:

$$\tilde{\Phi} = \arg_{\Phi_i} \left( opt_{(J_i, \Phi_i, \Psi)} \{f\} \right)$$

$\tilde{\psi}$ defines the set of link parameter values for node $v_i$, and may include transmission and/or reception parameters:

$$\tilde{\Psi} = \arg_{\Psi} \left( opt_{(J_i, \Phi_i, \Psi)} \{f\} \right).$$

Quality Cost Progress

An example of a special objective function is Quality Cost Progress ($Z^{QCP}$). The Quality Cost Progress (QCP) between node $v_i$ and node $v_j$, for flow $\phi_i \in \Phi_i$ is defined as:

$$Z_{ij}^{QCP} = f(C_i^{(\phi i)}, C_j^{(\phi i)}, Q_{ij}, W_i^{(\phi i)}, \psi_{ij})$$

where:

$C^{(\phi i)}$ is the cost from node $v_i$, $v_i \in V$, to the destination for flow $\phi_i \in \Phi$. Each flow is associated with a destination.

$Q_{ij}$ is the quality (e.g. signal-to-interference and noise ratio) of the link between node $v_i$ and node $v_j$.

$W_i^{(\phi i)}$ is weighting parameters for node $v_i$, $v_i \in V$, and for flow $\phi_i \in \Phi_i$.

The weighting parameters may be any combination of at least fixed prioritization weights, adaptive prioritization weights, QoS-related parameters (such as due time, latency etc), fairness criteria and so forth. It may be somewhat more natural and straightforward to incorporate QoS parameters in the optimization when considering flow as an optimization variable, since each flow is normally associated with given QoS requirements.

This allows us to write the optimization (here assumed to be a maximization) of the objective function based on QCP as:

$$Z_i^{QCP \max} = \max_{j \in J_i, \phi_i \in \Phi_i, \psi_{ij} \in \Psi} \{Z_{i,j}^{QCP}\},$$

which results in a combination of relay node, flow and one or more link parameters. Note if $Z_i^{QCP \max}$ is negative, no forwarding is executed Another exemplary objective function is based on the Information Cost Progress ($Z^{ICP}$). The following additional notation may be used:

$\Gamma_{ij}$ is the signal-to-noise+interference ratio (SINR) in this example. The SINR can then be an instantaneous or average SINR. For example, the SINR can be determined by letting all relay stations intending to transmit, sending a (multicast/broadcast) interrogation message that enables the instant SNR to be measured.

$R_{ij}$ is the set of achievable rates between node $v_i$ and node $v_j$, given by the SINR $\Gamma_{ij}$. The rates are constructed by combination of modulation, coding and spreading schemes.

The Information Cost Progress (ICP) between node $v_i$ and node $v_j$, for flow $\phi_i \in \Phi_i$ using rate $r_{ij}$ is defined as:

$$Z_{ij}^{ICP} = f(C_i^{(\phi i)}, C_j^{(\phi i)}, W_i^{(\phi i)}, r_{ij}).$$

This allows us to write the optimization (here assumed to be a maximization) of the objective function based on ICP as:

$$Z_i^{ICP \max} = \max_{j \in J_i, \phi_i \in \Phi_i, r_{ij} \in R_{ij}} \{Z_{i,j}^{ICP}\}$$

which results in a combination of relay node, flow and a selected rate. Note if $Z_i^{ICP \max}$ is negative, no forwarding is executed.

When using cost progress in some form, cost information may be provided by an independent route determination protocol such as any well known shortest path protocol (e.g. Bellman Ford), e.g. using energy, delay or hop metric, or a route determination protocol more customized to diversity forwarding.

The route determination protocol or alternatively another topology control protocol may provide the basic setting of transmit power.

In addition, other selection criteria may be employed in determining which packet to send. As previously mentioned, an important selection criterion may be QoS, i.e. giving priority for packets with certain delivery requirements on e.g. delay or bandwidth. Hence, the cost progress metric may be combined with QoS parameters, such as delay or due time data as an extended QoS metric. Moreover, it is of course important to provide some sort of fairness towards sources in the network so as to avoid starvation, channel capture and so forth.

Apparently, the use of flow as an optimization variable implicitly results in a selection of destination direction, since each flow has a unique destination. Alternatively, destination can be used directly as an optimization variable in order to consider direction, as will be exemplified below.

A particular example of an information cost progress function, defined as the rate times the differential cost progress (cost reduction from transmitting node i to receiving node j, assuming cost that increases from the destination), is given below:

$$Z_{ij}^{(D)} = f(C_i^{(D)}, C_j^{(D)}) \cdot r_{ij}(SNR_{ij}/SINR_{ij})$$

where $Z_{ij}^{(D)}$ is the information cost progress for a packet heading in the direction towards destination D and where i is the transmitting node and j is an interrogated node. Furthermore, $r_{ij}(SNR_{ij}/SINR_{ij})$ is a supported rate between node i to node j for a given SNR/SINR between node i and node j. This function could for example be jointly optimized with respect to relay node, destination node and rate. The costs to destination node D and the objective function $f$ could reflect any of a multitude of factors. For instance, the costs and the objective function may reflect the forward progress in geographic distance, but other cost progress measure may also be used. Forward progress in geographic distance may for example be determined based on position information such as GPS (Global Positioning System) information or estimated based on path loss calculations.

The information cost progress measure is determined, after a node has received one or more response messages with expected SNR/SINR values, but before the subsequent data message is being transmitted. Practically, this usually means that the transmitter goes through the buffer and determines the cost progress for each packet. As several packets may have the same destination, it suffices to determine the measure for the most important "same destination" packet, but still doing so for all destinations or flows represented in the buffer.

In reference [12], the optimal transmission range and code rates where investigated in a highly loaded frequency hopping packet radio network by a so-called information efficiency forward progress performance measure. The difference here is that we do not use information efficiency forward progress as a performance measure, but rather as an objective function to be optimized. This is made possible due to the interrogation-response phase and the selection among multiple relay candidate nodes. The rationale behind an objective function based on information forward progress is that the "speed over ground" for a packet or, equivalently the rate times the traversed distance towards the destination, shall be as high as possible. The expression for information forward progress defined below is useful for evaluation purposes and illustrates the existence of a maximum. Note that the analysis of the metric in the following does not follow reference [12]. Assume for example that an infinite number of relay nodes are positioned along a line in the desired direction of routing, and one is searching the optimum node to send to as well as at what rate should be used. A good measure to use is then the information forward progress, Z, given by Shannon's channel capacity formula times the hop-distance:

$$Z = R \cdot B \cdot lg_2\left(1 + \frac{P \cdot Const}{R^\alpha \cdot N}\right),$$

where P is the transmit power, N is the noise power, $\alpha$ is the propagation constant (typically between 2-4 and 2 for free space propagation), Const is a propagation constant, B is the bandwidth and R is the distance between the transmitter and receiver.

Figure 5:
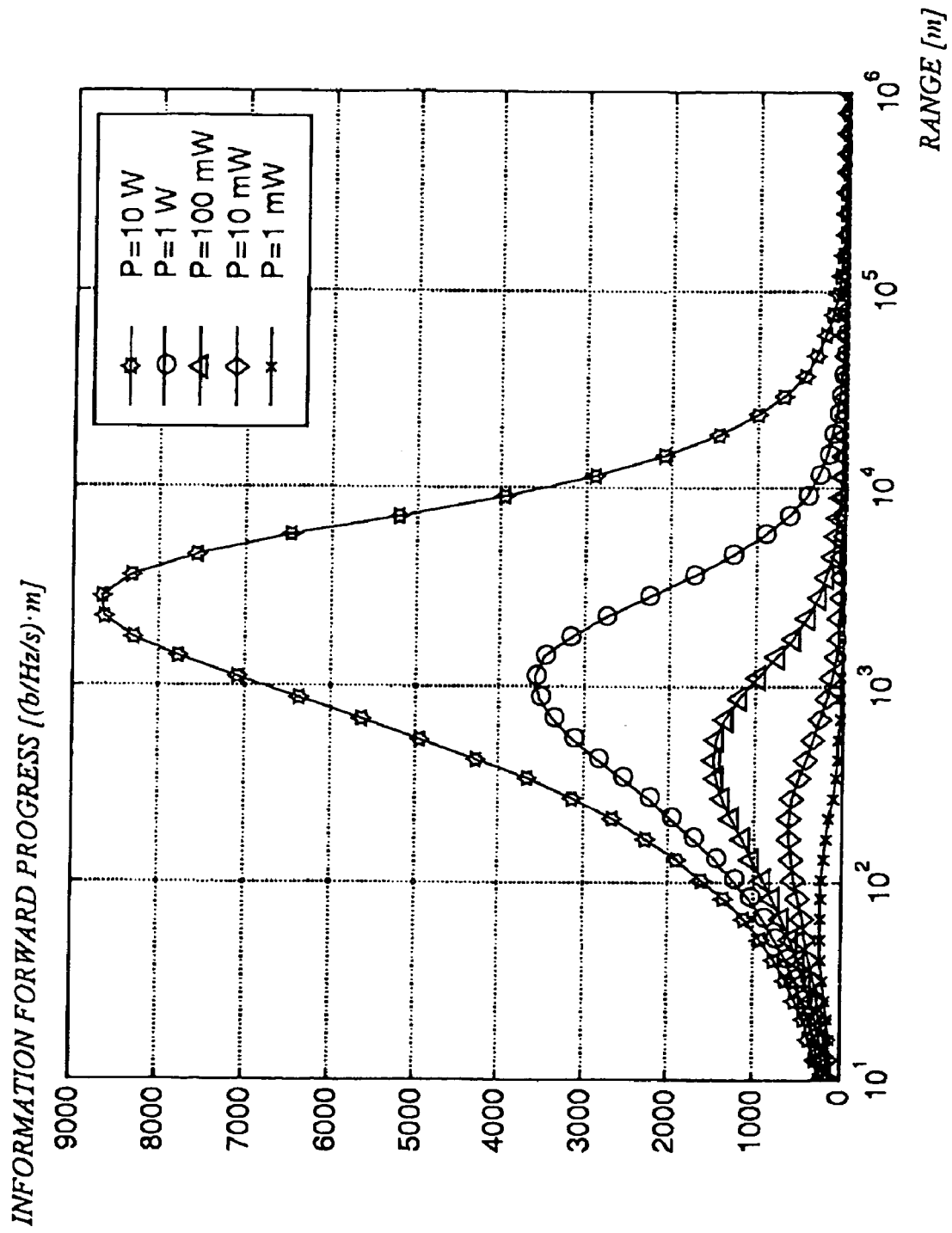
FIG. 5 is a schematic diagram illustrating different curves for information forward progress at different transmit power levels.

With B=20 MHz, N=k·T·B·NF (where NF=10 dB, T=273+25 K, k=1.38e-23), $\alpha$=2.6 the optima for different transmit power levels are clearly evident in FIG. 5. The maximum forward progress can however itself not be expressed in a closed form. However, the optimum distance $R_{Opt}$ can yield the upper bound of the channel efficiency as:

$$\frac{r}{B} \leq \frac{\alpha}{\ln(2)} \approx 1.4 \cdot \alpha$$

This illustrates that large signal constellations is generally not needed, i.e. for $\alpha$=2, a signal constellation with 3 bps/Hz will suffice. Even though the link optimization was exemplified with a cost metric based on distance and information, other metrics meeting similar objective criteria may be used.

As link adaptation may be employed, functionality for fragmentation, assembling and possibly also multiplexing/de-multiplexing will be exercised by the nodes at communication.

It will now be illustrated that the proposed invention also has benefits in a (Rayleigh) fading environment. One may for simplicity of the analysis assume that the sending node has large number of concentric circles where potential receiving nodes may be positioned. The optimum information forward progress can be estimated with the relation:

$$Z(R,M) = \int_j^\infty p(\beta, \gamma_0, M) \cdot Z(\beta, \gamma_0, R) d\beta,$$

where $$Z(\beta, \gamma_0, R) = R \cdot B \cdot lg_2(1 + \beta \cdot \gamma_0)$$

is the information forward progress and $$p(\beta, \gamma_0, M) = \frac{M}{\gamma_0} \cdot e^{-\beta} \cdot (1 - e^{-\beta})^{M-1}$$

is the pdf (power density function) for selection diversity with order M diversity and $$\gamma_0(R) = \frac{P \cdot Const}{R^\alpha \cdot N}$$

is the average SNR/SINR as a function of distance R and $$M = Const \cdot R^2$$

is the average number of nodes on a concentric circle at distance R. This means that the diversity order increases radically for large distances, but is also dependent of the density of nodes, reflected in the parameter Const.

Figure 6:
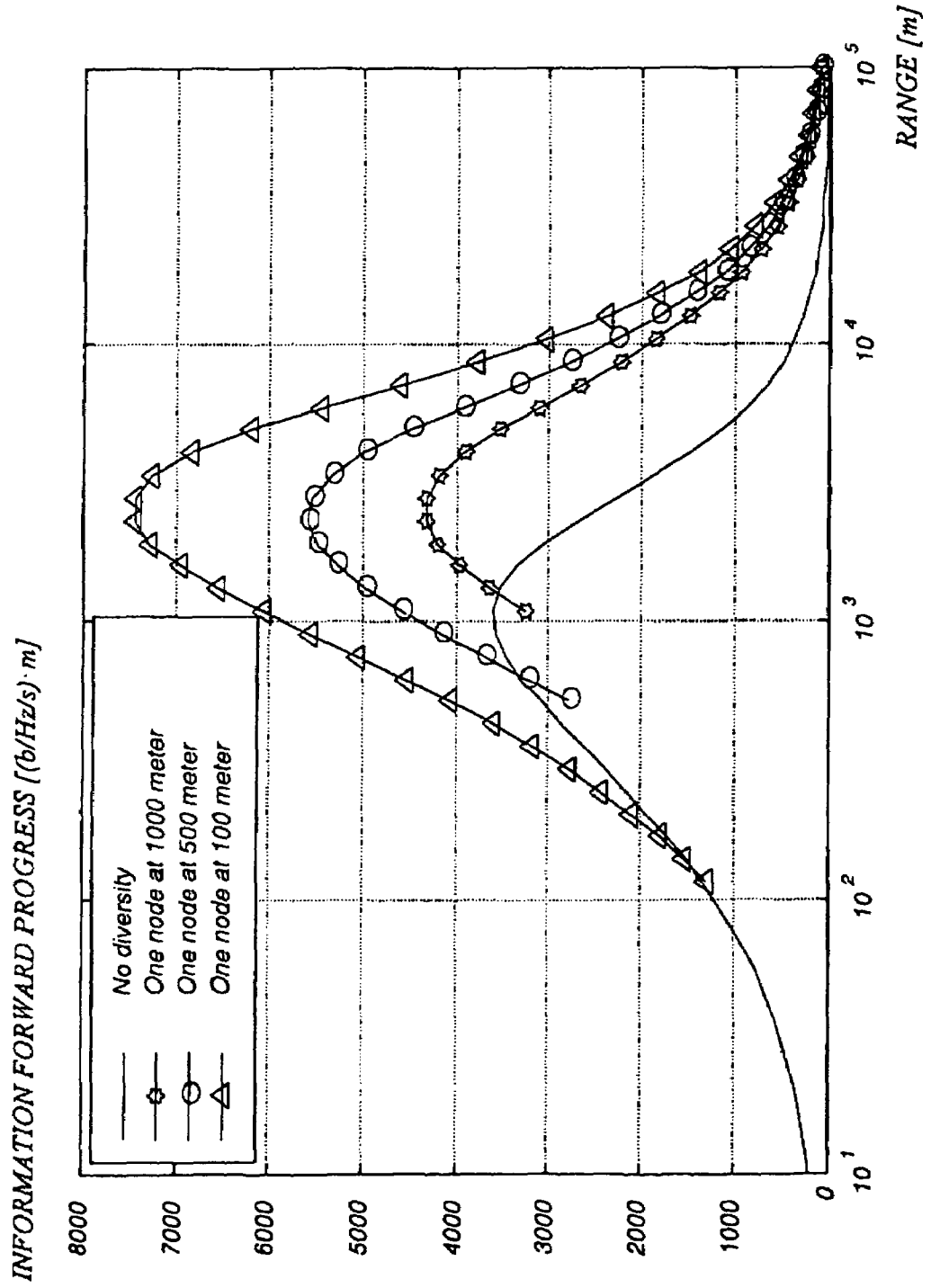
FIG. 6 is a schematic diagram illustrating diversity benefits on information forward progress.

Numerical calculation gives the curves in FIG. 6 for the same parameters as above, with P=1 W, and several Const values. Note that in practice, diversity order will be limited in contrast to the case when using a mathematically defined pdf for the SNR/SINR that has a very long tail with a non-zero value for high SNR/SINR values. It is in any case clear that diversity increases information forward progress.

Optimizations

As large quantities of control messages are sent, it is vital to keep the overhead and energy consumption as small as possible. This may be achieved by minimizing the quantities of information in the packets by implicit signaling. For instance, instead of using the fill address of the candidate nodes, one may use locally (and uniquely) assigned addresses (e.g. under the control of a route determination protocol). Since the addresses are local, short addresses will be sufficient. Another method is to transmit to only those candidate nodes that have a positive cost progress or a cost progress within a specific range or interval (e.g. exceeding a positive threshold). Hence, the address field is replaced with a shorter cost requirement field. One may also address candidate nodes implicitly by indicating that they are (a set of) neighbors of some neighbor of a transmitting node. For example, a candidate node is explicitly addressed in the packet, and one or more other suitable relay candidate nodes are implicitly addressed by indicating in die packet that they are neighbors of the explicitly addressed candidate node. This requires a protocol, to be executed that establishes neighbor relations, e.g. an incorporated function in a route determination protocol, as well known in Internet (Hello messages). This means that the overhead does not have to be as large as one may first assume.

It should also be noted that the steps preceding ti, i.e. what triggers a node to transmit, normally depend on what channel or medium access method that is used. For example, Slotted ALOHA, CSMA (Carrier Sense Multiple Access) or even a scheme with scheduled transmit occasions (like in STDMA) may be used.

The invention enables cluster of nodes to act cooperatively together to improve communication fidelity, e.g. through diversity. A further option is to assign predetermined stations exercising control functions by receiving and transmitting control messages.

Queuing disciplines are important since they are the key to fairly share the network resources and provide performance critical applications with performance guarantees. Generally, one makes a difference between queuing disciplines developed for best-effort applications (i.e. applications without QoS requirements) and disciplines developed for guaranteed-service applications (i.e. applications with QoS requirements). For best-effort connections the most important objective is to share the resources in a fair manner, and examples of queuing algorithms developed for this service type are: 1) Weighted Round Robin; 2) Deficit Round Robin; and 3) Weighted Fair Queuing, all of them trying to emulate the Generalised Processor Sharing algorithm. Naturally, for guaranteed-service applications the most important objective is to give performance guarantees, and examples of queuing disciplines fulfilling this task are: 1) Weighted Fair Queuing; 2) Virtual Clock; and 3) Earliest Due Date.

Implementational Aspects

Figure 7:
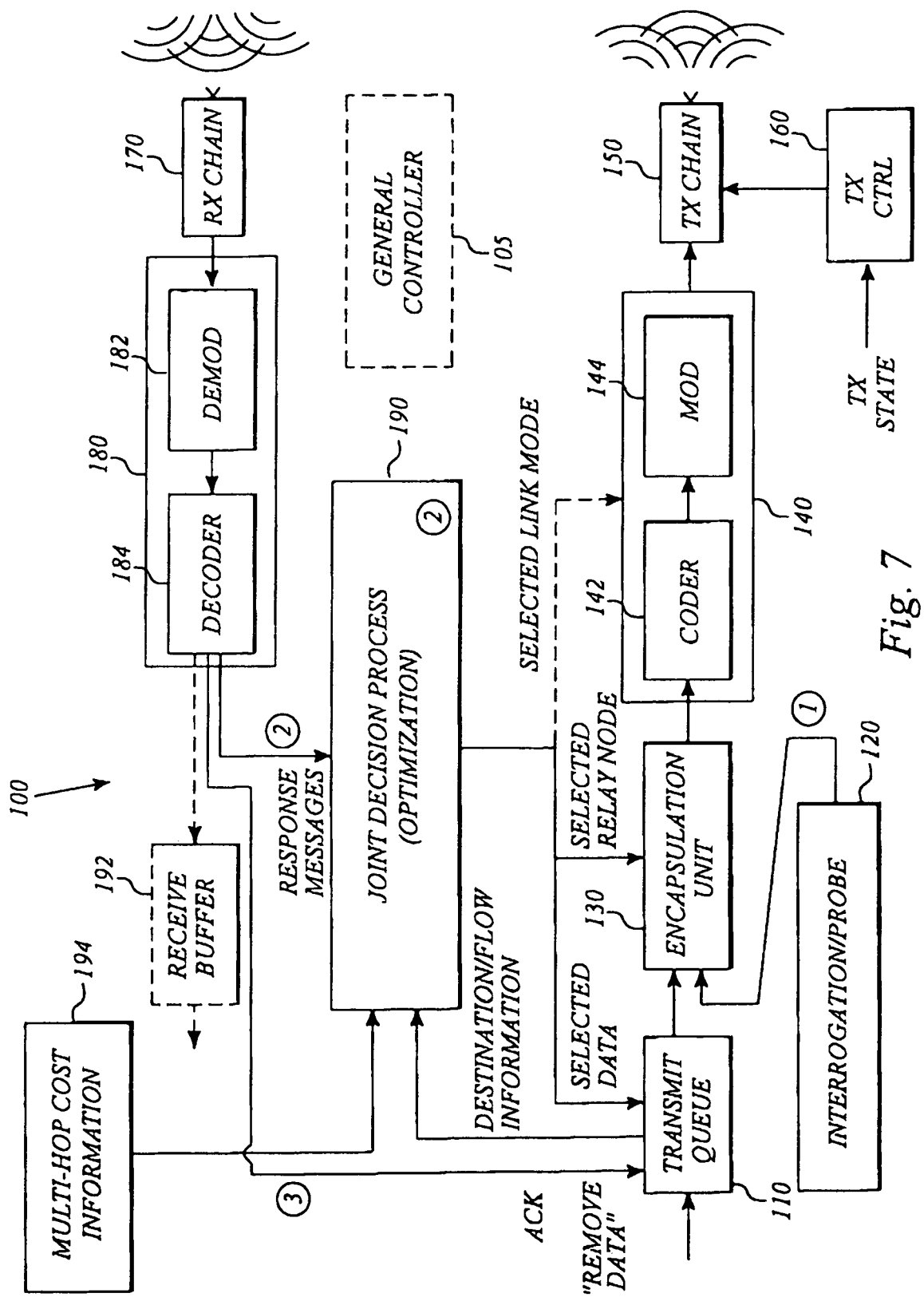
FIG. 7 is a schematic block diagram of relevant parts on the transmitter side according to an example embodiment.

FIG. 7 is a schematic block diagram of relevant parts on the transmitter side according to an exemplary embodiment of the invention. The transmitting node 100 of FIG. 7 basically comprises a general controller 105, a transmit buffer 110, an interrogation/probe Unit 120, an encapsulation unit 130, a coder and modulation unit 140, a conventional transmission chain 150 connected to an antenna or antenna system, a transmit parameter controller 160, a conventional receiver chain 170, a demodulation and decoder unit 180, a unit 190 for performing a joint decision process to select data, relay node and optional link mode, a receive buffer 192 and a unit 194 for providing multi-hop cost information.

In the first round (1), an interrogation probe is transferred to the encapsulation unit 130 for encapsulation and (explicit and/or implicit) addressing. From an addressing perspective, the transmitting node typically employs broadcasting or multicasting to transmit the interrogation message to selected relay candidate nodes in the multi-hop network. The relay candidate nodes may for instance be selected by the general controller 105 based on multi-hop cost information obtained from an underlying route determination protocol, perhaps together with additional information. The encapsulated interrogation probe is transferred to the coder and modulation unit 140 for coding 142 and modulation 144, and further on to the transmission chain 150 for transmission towards the relay candidate nodes. The transmit power level and/or antenna weights used for transmission are given by the transmit parameter controller 160.

In the second round (2), the transmitting node 100 receives response messages from a number of relay candidate nodes via the receiver chain 170 and the unit 180 for demodulation 182 and decoding 184. The response messages are then transferred to the decision unit 190, which then selects data, relay node and optionally also link mode for transmission in a joint decision process. Preferably, the decision unit 190 performs a joint optimization based on for example cost progress, as previously described in detail. In the decision/optimization process, the decision unit 190 normally makes use of link performance information such as SNR/SINR reported in the response messages, information on which destinations/flows that are represented in the node as well as multi-hop cost information from an underlying route determination protocol such as Bellman-Ford or similar protocol. In the transmitting node 100, such cost information is preferably gathered and/or generated in the multi-hop cost information unit 194, which is connected to the decision unit 190. Information on selectable destinations and/or flows can be retrieved, e.g. by investigating the transmit queue or by maintaining a separate list of destinations/flows currently present in the node.

The selected data is then transferred from the transmit queue 110 to the encapsulation unit 130, which encapsulates die data and sets the address to the selected relay node. The encapsulated packet information is then transferred to the coder and modulation unit 140, which performs coding and modulation according to the selected link mode before the packet information is transmitted to the selected relay node.

In the third round (3), a data acknowledgement received from the selected relay node may optionally be employed for removing corresponding data from the transmit queue 110.

Individual control and information units, such as the transmit parameter controller 160, the joint decision process unit 190 and the multi-hop cost information unit 194 may cooperate with or even be integrated into the general controller 105, which in itself may include additional control functionality.

Figure 8:
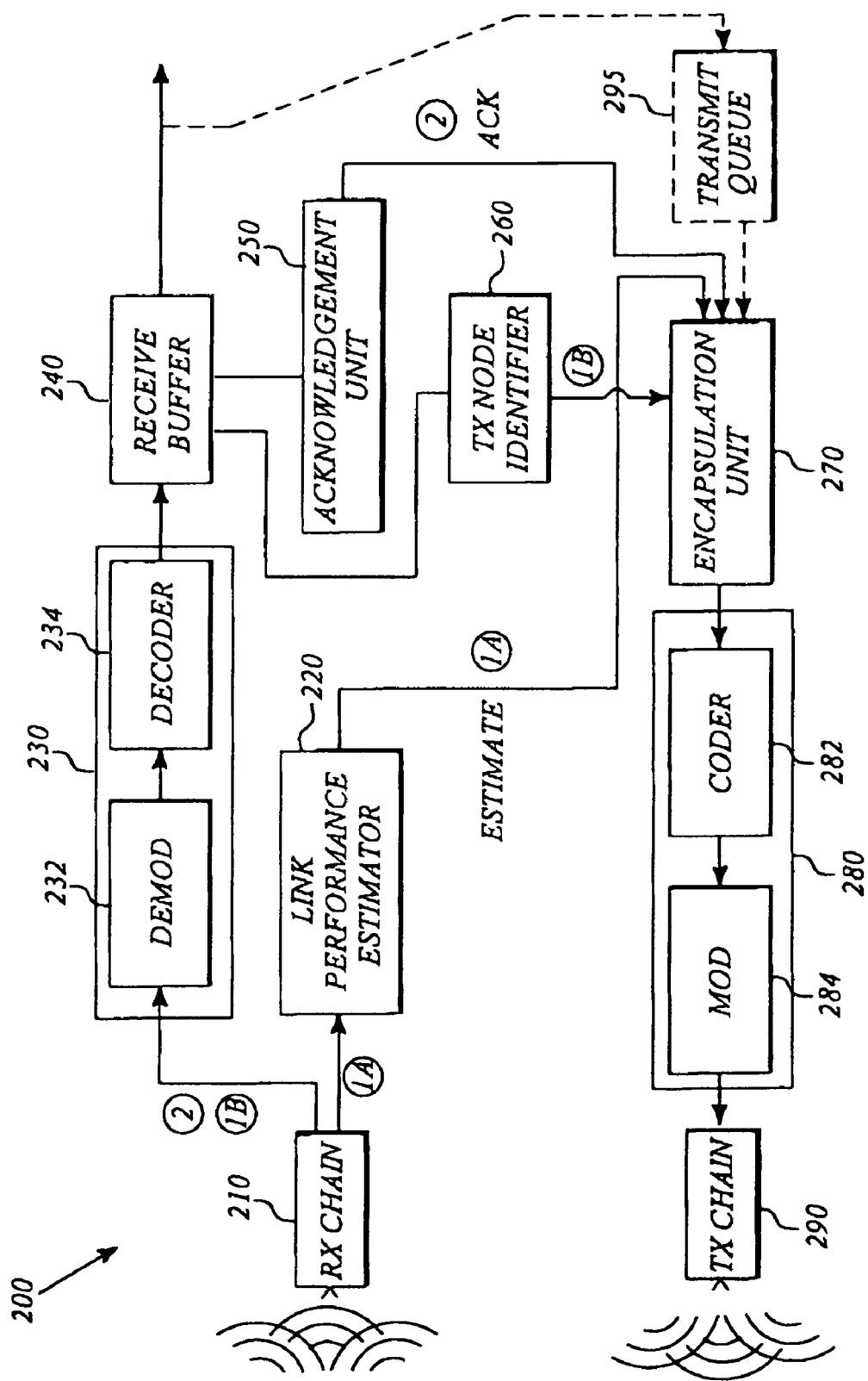
FIG. 8 is a schematic block diagram of relevant parts on the receiver side according to an example embodiment.

FIG. 8 is a schematic block diagram of relevant parts on the receiver side according to an exemplary embodiment of the invention. The relay candidate node of FIG. 8 basically comprises a conventional receiver chain 210 connected to an antenna or antenna system, a link performance estimator 220, a unit 230 for demodulation and decoding, a receive buffer 240, an acknowledgement unit 250, a transmit node identifier unit 260, an encapsulation unit 270, a coder and modulation unit 280, a conventional transmission chain 290 connected to an antenna or antenna system, and a transmit queue 295.

The relay candidate node receives an interrogation message from one or more transmitting nodes in the multi-hop network through the receiver chain 210. For multicasting, the relay candidate node includes functionality (not shown) for determining whether an interrogation message is intended for relay node by investigating explicit and/or implicit addressing information in the received interrogation message. In the following, we will consider the case when the interrogation message is actually intended for the relay candidate node.

In round (1A), die link performance estimator 220 estimates a link performance measure such as SNR/SINR (or alternatively transforms the SNR/SINR value into a supported rate) for transmission back to the interrogating node in a response message. The estimate it transferred to the encapsulation unit 270 for encapsulation and addressing. The encapsulated response information is then transmitted to the interrogating transmit node by using the unit 280 for coding 282 and modulation 284, as well as the transmission chain 290.

If the transmitter address is included in the interrogation message, the message is also transferred, in round (1B), via the unit 230 for demodulation 232 and decoding 234 to the receive buffer 240. The transmit node identifier unit 260 investigates the received interrogation message and extracts the transmitter address for transfer to the encapsulation unit 270. The transmitter address can then be used by the encapsulation unit 270 so that the response message reaches the interrogating transmit node.

If the relay candidate node 200 is selected by the interrogating transmit node, the relay node typically receives a packet signal from the transmit node through the receiver chain 210. In the second round (2), the received packet signal is then demodulated and decoded into packet data that is transferred to the receive buffer 240. The acknowledgement unit 250 may then issue a data acknowledgement (ACK) for transmission to the corresponding transmit node.

The packet data in the receive buffer 240 may subsequently be transferred to the transmit queue 295 for later transmission to relay candidate nodes further on in the multi-hop network.

It should be noted that the receiver may perform congestion control, e.g. when the receive buffer exceeds a given storage threshold. This may be effectuated when receiving an interrogation message by not responding or by including in the response an indication that the receiver can not receive.

Distributed Selection Process

As mentioned earlier, it should be understood that the joint selection process may be distributed to an associated control node responsible for one or more transmitting nodes.

Figure 9:
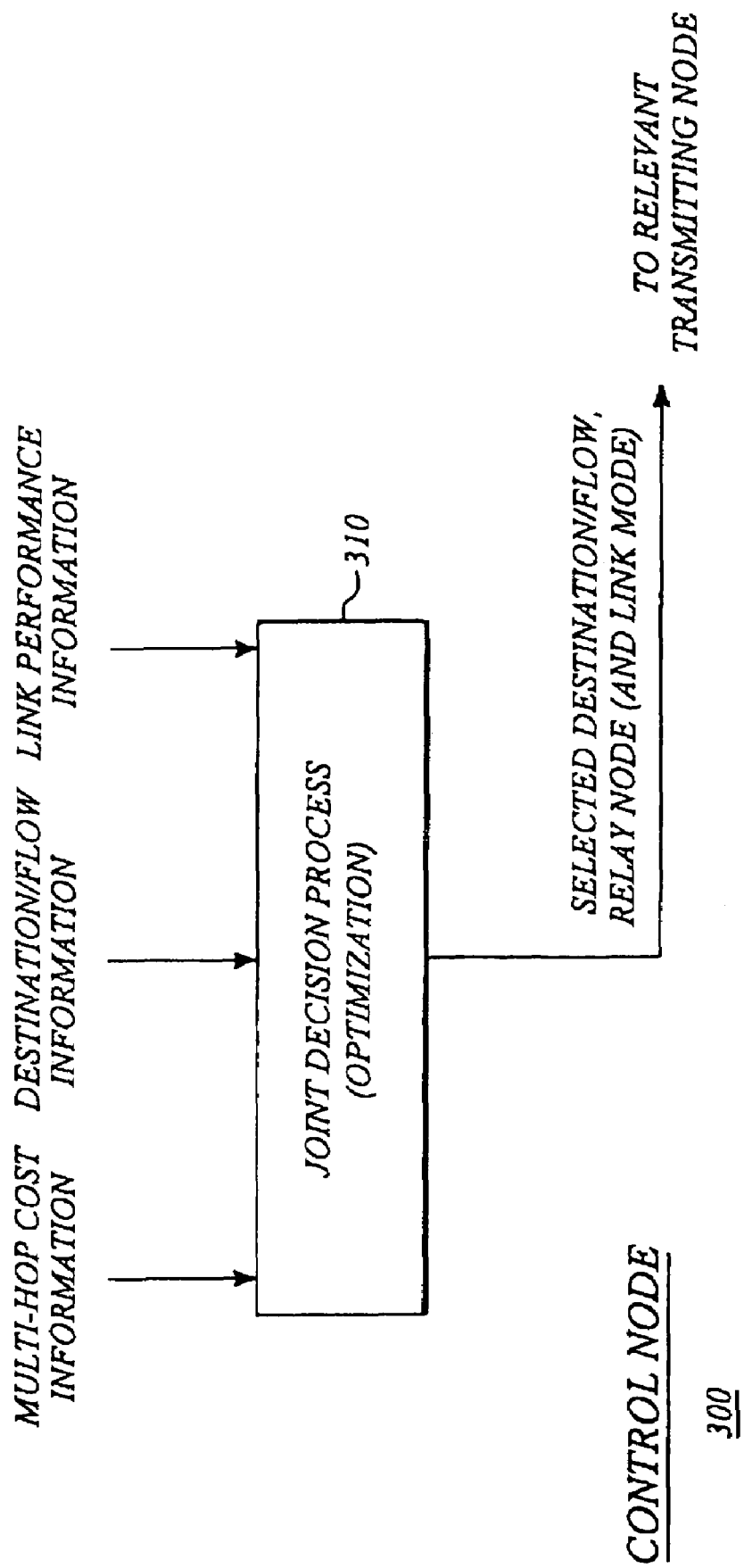
FIG. 9 illustrates the information flow for a control node responsible for the selection process for one or more transmitting nodes.

FIG. 9 illustrates the information flow for a control node responsible for the selection process for one or more transmitting nodes. The control node 300 is typically responsive to multi-hop cost information obtained e.g. from an underlying route determination protocol, information on which destinations/flows that are represented in the respective transmitting nodes as well as link performance information as reported through response messages. This means that relay candidate nodes may send their response messages to the control node 300. Tile control node 300 may then perform the joint decision process to select a combination of destination/flow, relay node, and optional link parameters for each transmitting node associated with the control node. Finally, the control node, which may have a more or less central role, transfers information on selected destination/flow, relay node and optional link parameters to each of its associated nodes.

MDF and MUD

As indicated above, MDF may be combined as well as adapted to handle the case of receivers employing multi-user detectors (MUD), i.e. capable of decoding multiple signals at the same time. In an exemplary embodiment of the invention with respect to MUD and MDF, a single fixed data rate (or upper limited rate) is used throughout the network and assumed to be known by all nodes. Assume that each one of a number of relay candidate nodes is capable of receiving and decoding interrogation messages from multiple transmitting nodes. Each node receiving multiple interrogation messages typically determines which transmitting nodes that can be decoded, and generally determines link performance information such as SNR/SINR or rate information for each link. In a practically feasible implementation, each receiving node determines a so-called SNR/SINR vector representing multiple received interrogation messages, and then selects to which interrogating node or nodes that a response message should be sent based on SNR/SINR, normally selecting only nodes with high performance links. The node receiving the response message evaluates the message together with possible other response messages from other candidate nodes, and checks to which relay node it may transmit and which data packet that is the most optimum to transmit. After selecting a data packet, the transmitting node sends the packet and awaits an acknowledgment in response. In an extension of the above combined MDF and MUD scheme, a transmitting node determines link parameters including a desired rate to transmit with and conveys the rate information in the interrogation message. A node receiving multiple interrogation messages may then consider rate information in the process of determining feasible transmitter(s).

MDF and Other Techniques

If Orthogonal Frequency Division Multiple Access (OFDMA) is used, the invention may further perform an opportunistic choice to select which sub-carrier (frequency channel) or set of sub-carriers (frequency channels) to use among multiple sub-carriers, i.e. multiplexing data to multiple users on single OFDM symbols. In this case, the relay nodes are informed on the selection for correct decoding. The multiplexing structure may for example be indicated in the header of the data packet. Also, note that multiple destinations and/or flows may be targeted by using different parts of the spectrum and the joint selection then takes this into account.

Also, the invention may be combined with standard SDF as outlined in [8], if extra control messages are (allowed to be) added or piggybacked on proposed MDF messages. In such a case, after the response phase, a set of candidate nodes on which SDF acts on are selected.

The novel forwarding scheme proposed by the invention may also be combined with beamforming. In MDF, a relay station may incorporate beamforming aspects when preparing for a transmission. In doing so, apart from selecting a power level and a beam direction, the beam parameters can be selected to ensure that a sufficient and appropriate number of potential relay nodes or stations are likely to be encountered. This means that there is an interplay between antenna-gain and antenna-beamwidth. The specific choice of antenna transmit parameters may be random, but preferably reflects topology and incorporates QoS aspects. N.B. the same transmit parameters adhere to the transmission of the interrogation message as well as the data message. Alternatively, MDF can also be used in the context of MIMO (Multiple Input Multiple Output) communication in selecting a single flow to a user.

General Discussion on Differences Between MDF and Prior Art

Further to the fact that no prior art technique allows joint selection of a combination of destination/flow among multiple destinations/flows, relay node among multiple relay candidate nodes as well as optional link parameters, a number of additional differences will be summarized below:

Differences Between MDF and HSDPA/HDR/Opportunistic Beamforming

HSDPA, HDR and Opportunistic Beamforming (OB) are aimed for cellular network, whereas MDF targets;
 a multi-hop network with,
 a distributed multiple access protocol and with,
 potentially mobile stations.
HSDPA, HDR and OB must send any packet directly to its destination mobile station (MS), whereas MDF may select among multiple relay nodes (which does not make sense and is not possible in HSDPA, HDR or OB at all). This means that MDF can offer a higher degree of diversity as well as additional degrees of freedom in selecting receive node The larger flexibility (implied by the additional degrees of freedom) may also be used to shape and enhance QoS in greater extent to the more limited choice offered in HSDPA and alike.

HSDPA and HDR normally has no coordination between base stations and a slower control cycle than that of MDF, which implies that the actual SNR/SINR situation may change from the reporting until data is transmitted. In MDF, the three/four-phase protocol ensures that reported SNR/SINR from the interrogation response phase remains the same (or is improved) over the whole data phase. The SNR/SINR in MDF may e.g. be improved if some station decide not to transmit, but cannot be worsened.

HSDPA and HDR uses continuous uplink reporting of SNR/SINR information for active HSDPA users, whereas the interrogation-response phases of MDF allow one to interrogate, on an instantaneous basis, a limited set of candidate stations of their respective instantaneous SNR/SINR. HSDPA may even have up to hundreds of stations continuously signaling their experienced SNR/SINR.

N.B. As OB has not been realized in practice, and protocol aspects has not been discussed in any detail, it is not known how OB will behave. It has however been indicated that no changes to MS (probably meaning CDMA) are needed. This means that OB is likely to behave similar to HDR.

Differences Between MDF and Opportune Routing

Opportune routing generally uses a monitoring feature that acts on a slow time scale (meaning that it is a background activity) and that updates a relay station's routing database. In contrast, MDF uses a fast adaptation through the interrogation-response phase to perform fast local forwarding decisions.

Opportune routing does not support parallel transmissions, i.e. a packet (e.g. control or data) transmitted to at least two adjacent stations, whereas MDF may exploit the possibility of sending control packets (interrogation and response packets) to multiple adjacent stations.

Opportune routing does not employ broadcasting/multicasting of interrogation messages and/or data.

Difference Between MDF and SDF

In relation to standard SDF, as outlined in [8], which is its closest relative, the proposed invention is guaranteed to always perform better than standard SDF — which itself has been shown to be superior to traditional shortest path routing schemes — given that the channel is stationary over the three/four phase exchange and that power level measurement and adjustment are precise.

The reason why the proposed invention performs better is that, in contrast to standard SDF in which a single packet at some data rate selects among a limited set of relays, the invention allows for selection among more relays for multiple packets while adaptively optimizing link parameters for optimal communication. Even with slight power measurement and adjustment errors, the performance is expected to be superior. The relative benefit of MDF over SDF will be most significant when the transmit power is low. This is so because at large communication ranges, even SDF with constrained "direction" of forwarding is likely to find multiple nodes near the communication range and in the right "direction".

Another difference is that the "standard SDF" (primarily) takes retroactive decisions and the invention here takes decision prior to the data transmission.

Yet, in reference [8], an alternative embodiment of SDF based on multicast-RTS and unicast-CTS is also proposed. This is similar to IEEE802.11 DCF, acquiring a floor, but enhanced with a multicast RTS and aimed for multi-hop routing. Even if the decision is taken in the same order, it lacks the selection among multiple packets as well as the suggested opportunistic link adaptation.

In other words, SDF focuses on selecting relay node and performing forwarding for one packet at a time, whereas MDF may opportunistically select from multiple packets. In addition, in the main embodiment of SDF, the idea of a retroactive forwarding decision (after the data packet has been sent) is deployed. MDF on the other hand, decide exactly which packet to send (based on the interrogation-response process).

In summary, exploiting multi-user diversity effects in general is a good feature. Apart from that, one can select relay direction (relay node) through a wise packet choice, and also exploit and benefit from a fading channel. Note that benefits in SNR/SINR comes both from fading peaks of the desired signal, and fading minima from interfering and undesired sources. In addition the scheme allows a metric to be defined and optimized for instantaneous SNR/SINR situations and its structure allows maximization of throughput and minimization of delay. A special example of such a metric may be a joint measure on the amount of information being sent in combination with the progress towards the destination source.

Given the above, it should be recognized that the above invention may incorporate or exploit other aspects. For instance, other MAC protocols, such as Seedex [13], may be used. A variety of route determination protocols and cost metrics may be deployed. The technology may be combined with congestion control mechanisms, e.g. through adaptively varying the transmit probability. The technology may also send multiple packets consecutively in a time slot as long as there is space in the time slot and transmission adheres to given rules (e.g., multiplexing of several packets within one timeslot).

The embodiments described above are merely given as examples, and it should be understood that the present invention is not limited thereto. Further modifications, changes and improvements which retain the basic underlying principles disclosed and claimed herein are within the scope of the invention.

APPENDIX

SNR MUD Definition

In order to define the SNR for a MUD decoder, the received signals are ordered according to the power levels:

$$P_1 \leq P_2 \leq P_3 \ldots P_N$$

A list of the identities of the transmitting nodes is then assembled in accordance to the ordered list of receive powers. To each item in the list there is an associated $SNR_k$ defined according to:

$$SNR_k = \frac{P_k}{N + \sum_{i=1}^{k-1} P_i},$$

where N is the noise power, $P_k$ is the receive power.

The list of transmitter identities and the associated SNRs is then for example used by the node itself to select to which transmitting node(s) it should respond, or multicasted/broadcasted in the response message. Alternatively, rates (or communication modes with some FEC and modulation) may be determined and sent back in the response message. This enables detailed channel aspects such as frequency selectivity to be taken into account.

REFERENCES

[1] R. Rom, M. Sidi, "Multiple Access Protocols, Performance and Analysis", Springer-Verlag, New York, 1990, ISBN-0-387-97253-6, pp. 1-5.
[2] "Enhanced Interior Gateway Routing Protocol" as printed Apr. 7, 2003 from www.cisco.com/warp/public/103/eigrp-toc.pdf.
[3] R. Nelson and L. Kleinrock, "The spatial Capacity of a slotted ALOHA multihop packet radio network with capture", in Trans. On Com., June 84.
[4] J. Jubin and J. D. Tornow, "The DARPA packet radio network protocols" in IEEE, Proceedings, January 87. pp. 21-32.
[5] M. B. Pursely and H. B. Russel, "Network protocols for frequency-hop packet radios with decoder side information", in IEEE J. Selected Areas of Com., 12(4) 1994, pp. 155-174.
[6] U.S. Pat. No. 6,097,703.
[7] International Patent Application Publication WO 98/56140.
[8] U.S. patent application publication US 2002/0051425 A1.
[9] "UTRA (Universal Terrestrial Radio Access) High Speed Downlink Packet Access (HSDPA)", 3GPP, TS [25.308], v. 0.1.0, September, 2001.
[10] TIA/EIA IS-856, "CDMA 2000: High rate packet data air interface specification", Std., November 2000.
[11] P. Viswanath, D. Tse and R. Laroia, "Opportunistic Beamforming using Dumb Antennas", IEEE Transactions on Information Theory, vol. 48(6), June, 2002.
[12] M. W. Subbarao and B. L. Hughes, "Optimum Transmission Ranges and Codes Rates for Frequency-Hop Packet Radio Networks" in IEEE Transactions on communication, Vol. 48, No. 4, April 2000.
[13] R. Rozovsky and P. R. Kumar, "SEEDEX: A MAC protocol for ad hoc networks", Proceedings of The ACM Symposium on Mobile Ad Hoc Networking & Computing, MobiHoc 2001, pp. 67-75, Long Beach, Oct. 4-6, 2001.

The invention claimed is:

1. A method for forwarding information in a multi-hop network having multiple nodes, said method comprising the steps of:
   jointly selecting, for at least one transmitting node, i) relay node among multiple relay candidate nodes and ii) at least one of:
      a) destination among multiple destinations represented in the transmit queue of said at least one transmitting node; and
      b) flow among multiple flows represented in said at least one transmitting node;
   selecting a set of information from the transmit queue of said at least one transmitting node based on at least one of selected destination and flow; and
   transmitting the selected set of information to the selected relay node
   wherein said method further comprises the steps of:
   said at least one transmitting node transmitting an interrogation message to said multiple relay candidate nodes in the network; and
   each one of said multiple relay candidate nodes replying, in response to said interrogation message, with a response message for said at least one transmitting node; and
   wherein said step of jointly selecting is performed at least partly based on said response messages from said multiple relay candidate nodes.

2. The method according to claim 1, wherein said step of jointly selecting further comprises selecting iii) at least one link parameter, and said step of transmitting the selected set of information to the selected relay node is performed based on said selected at least one link parameter.

3. The method according to claim 1, wherein said step of jointly selecting comprises the step of jointly selecting a combination of relay node and destination among said multiple relay nodes and said multiple destinations, and said step of selecting a set of information comprises the step of selecting a set of information heading for the selected destination from the transmit queue.

4. The method according to claim 1, wherein said step of jointly selecting comprises the step of jointly selecting a combination of relay node and flow among said multiple relay nodes and said multiple flows, and said step of selecting a set of information comprises the step of selecting a set of information belonging to the selected flow from the transmit queue.

5. The method according to claim 1, wherein said step of jointly selecting is performed based on information representing link performance between said at least one transmitting node and each one of said multiple relay candidate nodes.

6. The method according to claim 1, wherein said step of jointly selecting is performed based on optimization of an objective function that includes information cost progress.

7. The method according to claim 1, wherein said step of jointly selecting is performed based on at least one quality of service (QoS) parameter.

8. The method according to claim 1, wherein said step of jointly selecting is also based on cost information from an underlying route determination protocol.

9. The method according to claim 1, farther comprising the steps of:
   each one of said relay candidate nodes determining link performance representing information for the corresponding link between said at least one transmitting node and the relay candidate node based on the received interrogation message; and
   each one of said relay candidate nodes replying to said at least one transmitting node with a response message including said link performance representing information,
   wherein said step of jointly selecting is performed at least partly based on said link performance representing information included in the response messages from said multiple relay candidate nodes.

10. The method according to claim 9, wherein said interrogation message is transmitted using at least one predetermined transmit parameter, and said selected set of information is subsequently transmitted to the selected relay node using substantially the same at least one predetermined transmit parameter that was used for transmission of the interrogation message.

11. The method according to claim 10, wherein multiple transmitting nodes are operated for time-synchronized transmission of interrogation messages as well as time-synchronized transmission of information.

12. The method according to claim 10, wherein said at least one predetermined transmit parameter includes at least one of transmit power level and antenna weights.

13. The method according to claim 1, wherein said steps of transmitting an interrogation message, replying with a response message, jointly selecting and forwarding information are performed within a period of time that has a shorter duration than the channel coherence time.

14. The method according to claim 1, wherein said at least one transmitting node determines, based on each received response message, link performance representing information for the corresponding link between said at least one transmitting node and the replying relay candidate node, and said step of jointly selecting is performed based on said link performance representing information.

15. The method according to claim 1, further comprising, for at least one of said relay candidate nodes, the steps of:
    receiving, from multiple transmitting nodes, corresponding interrogation messages;
    determining, in response to each interrogation message, link performance information for the link between the corresponding transmitting node and the relay candidate node; and
    replying, to at least one transmitting node associated with a link having relatively high link performance, with a response message comprising information on the corresponding link performance.

16. The method according to claim 1, further comprising the step of said selected relay candidate node replying, to said at least one transmitting node, with an acknowledgment confirming reception of said selected set of information.

17. The method according to claim 1, wherein said multi-hop network is a packet radio network.

18. A method for forwarding information in a multi-hop network having multiple nodes, said method comprising the steps of:
    performing probing between a transmitting node and multiple relay candidate nodes, using at least one predetermined transmit parameter for probe transmission;
    determining information representing link performance for links between said transmitting node and said relay candidate nodes based on said probing;
    jointly selecting, based on said link performance representing information, a combination of:
    i) relay node among said multiple relay candidate nodes,
    ii) at least one of:
        a) destination among multiple destinations represented in the transmit queue of said transmitting node; and
        b) flow among multiple flows represented in said transmitting node; and
    iii) link mode scheme;
    selecting a set of information from the transmit queue of said at least one transmitting node based on at least one of selected destination and flow;
    transmitting said selected set of information from said transmitting node to the selected relay node, using substantially the same at least one predetermined transmit parameter that was used for probe transmission and said selected link mode scheme.

19. A system for forwarding information in a multi-hop network having multiple nodes, said system comprising:
    means for jointly selecting, for at least one transmitting node, i) relay node among multiple relay candidate nodes and ii) at least one of:
        a) destination among multiple destinations represented in the transmit queue of said at least one transmitting node; and
        b) flow among multiple flows represented in said at least one transmitting node;
    means for selecting a set of information from the transmit queue of said at least one transmitting node based on at least one of selected destination and flow;
    means for transmitting the selected set of information to the selected relay node,
    wherein said system further comprises:
    means for transmitting an interrogation message from said at least one transmitting node to said multiple relay candidate nodes; and
    means, provided in each one of said relay candidate nodes, for replying, in response to said interrogation message, with a response message for said at least one transmitting node; and
    wherein said means for jointly selecting is configured to operate at least partly based on said response messages from said multiple relay candidate nodes.

20. The system according to claim 19, wherein said means for jointly selecting is configured for further selecting iii) at least one link parameter, and said means for transmitting the selected set of information to the selected relay node is performed based on said selected at least one link parameter.

21. The system according to claim 19, wherein said means for jointly selecting is configured for jointly selecting a combination of relay node and destination among said multiple relay nodes and said multiple destinations, and said means for selecting a set of information is configured for selecting a set of information heading for the selected destination from the transmit queue.

22. The system according to claim 19, wherein said means for jointly selecting is configured for jointly selecting a combination of relay node and flow among said multiple relay nodes and said multiple flows, and said means for selecting a set of information is configured for selecting a set of information belonging to the selected flow from the transmit queue.

23. The system according to claim 19, wherein said means for jointly selecting is configured to operate based on information representing link performance between said at least one transmitting node and each one of said multiple relay candidate nodes.

24. The system according to claim 19, wherein said means for jointly selecting is configured for optimization of an objective function that includes information cost progress.

25. The system according to claim 19, wherein said means for jointly selecting is configured to operate based on at least one quality of service (QoS) parameter.

26. The system according to claim 19, wherein said means for jointly selecting also operates based on cost information from an underlying route determination protocol.

27. The system according to claim 19, further comprising:
    means, provided in each one of said relay candidate nodes, for determining link performance representing information for the corresponding link between said at least one transmitting node and the relay candidate node based on the received interrogation message; and means, provided in each one of said relay candidate nodes, for replying to said at least one transmitting node with a response message including said link performance representing information, wherein said means for jointly selecting is configured to operate at least partly based on said link performance representing information included in the response messages from said multiple relay candidate nodes.

28. The system according to claim 27, wherein said means for transmitting an interrogation message is configured to transmit said interrogation message using at least one predetermined transmit parameter, and said means for transmitting a selected set of information is configured to transmit said set of information to the selected relay node using substantially the same at least one predetermined transmit parameter that was used for transmission of the interrogation message.

29. The system according to claim 28, wherein multiple transmitting nodes are operated for time-synchronized transmission of interrogation messages as well as time-synchronized transmission of information.

30. The system according to claim 28, wherein said at least one predetermined transmit parameter includes at least one of transmit power level and antenna weights.

31. The system according to claim 19, wherein the three phases of interrogation, response and forwarding for a specific set of information are performed within a period of time that has a shorter duration than the channel coherence time.

32. The system according to claim 19, wherein said at least one transmitting node comprises means for determining, based on each received response message, link performance representing information for the corresponding link between said at least one transmitting node and the replying relay candidate node, and said means for jointly selecting is configured to operate based on said link performance representing information.

33. The system according to claim 19, wherein said at least one transmitting node further comprises means for implicitly addressing at least one of said multiple relay candidate nodes based on an indication that it is a neighbor of an explicitly addressed relay candidate node.

34. The system according to claim 19, wherein at least one of said relay candidate nodes receives interrogation messages from multiple transmitting nodes, and said at least one relay candidate node comprises:

means for determining, in response to each interrogation message, link performance information for the link between the corresponding transmitting node and the relay candidate node; and means for replying, to at least one transmitting node associated with a link having relatively high link performance, with a response message comprising information on the corresponding link performance.

35. The system according to claim 19, further comprising means for replying from the selected relay candidate node to said at least one transmitting node with an acknowledgment confirming reception of said selected set of information.

36. The system according to claim 20, wherein said at least one link parameter includes parameters representing modulation and coding scheme.

37. The system according to claim 19, wherein said multi-hop network is a packet radio network.

38. A communication node in a packet radio multi-hop network, said communication node comprising:

means for jointly selecting i) relay node among multiple relay candidate nodes and ii) at least one of:

a) destination among multiple destinations represented in the transmit queue of said communication node; and b) flow among multiple flows represented in said communication node;

means for selecting a set of information from the transmit queue of said communication node based on at least one of selected destination and flow;

means for transmitting the selected set of information to the selected relay node, wherein said communication node further comprises means for transmitting an interrogation message from said at least one transmitting node to said multiple relay candidate nodes, wherein said means for jointly selecting is configured to operate at least partly based on interrogation response messages received from said multiple relay candidate nodes.

39. The communication node according to claim 38, wherein said means for jointly selecting is configured for further selecting iii) at least one link parameter, and said means for transmitting the selected set of information to the selected relay node is performed based on said selected at least one link parameter.

40. The communication node according to claim 38, wherein said means for jointly selecting is configured for jointly selecting a combination of relay node and destination among said multiple relay nodes and said multiple destinations, and said means for selecting a set of information is configured for selecting a set of information heading for the selected destination from the transmit queue.

41. The communication node according to claim 38, wherein said means for jointly selecting is configured for jointly selecting a combination of relay node and flow among said multiple relay nodes and said multiple flows, and said means for selecting a set of information is configured for selecting a set of information belonging to the selected flow from the transmit queue.

42. The communication node according to claim 38, wherein said means for jointly selecting is configured to operate based on information representing link performance between said communication node and each one of said multiple relay candidate nodes.

43. The communication node according to claim 38, wherein said means for jointly selecting also operates based on cost information from an underlying route determination protocol.

44. The communication node according to claim 38, further comprising means for implicitly addressing at least one of said multiple relay candidate nodes based on an indication that it is a neighbor of an explicitly addressed relay candidate node.

45. The communication node according to claim 39, wherein said at least one link parameter includes parameters representing modulation and coding scheme.

46. A method for forwarding information in a multi-hop network having multiple nodes, said method comprising the steps of:

jointly selecting, for at least one transmitting node, i) relay node among multiple relay candidate nodes and ii) at least one of:

a) destination among multiple destinations represented in the transmit queue of said at least one transmitting node; and b) flow among multiple flows represented in said at least one transmitting node;

selecting a set of information from the transmit queue of said at least one transmitting node based on at least one of selected destination and flow; and transmitting the selected set of information to the selected relay node wherein said method further comprises the steps of:

said at least one transmitting node transmitting an interrogation message to said multiple relay candidate nodes in the network; and each one of said multiple relay candidate nodes replying, in response to said interrogation message, with a response message for said at least one transmitting node; and wherein said step of jointly selecting is performed at least partly based on said response messages from said multiple relay candidate nodes, and based on optimization of an objective function, wherein said objective function is dependent on given input parameters characterizing the multi-hop network and optimization variables that can be selected to optimize the objective function, wherein said optimization variables include at least relay node and flow and/or destination.

* * * * *

UNITED STATES PATENT AND TRADEMARK OFFICE
CERTIFICATE OF CORRECTION

PATENT NO. : 7,545,765 B2
APPLICATION NO. : 10/729846
DATED : June 9, 2009
INVENTOR(S) : Larsson et al.

It is certified that error appears in the above-identified patent and that said Letters Patent is hereby corrected as shown below:

In Column 2, Line 55, delete "die" and insert -- the --, therefor.

In Column 4, Line 35, delete "weights)" and insert -- weights, --, therefor.

In Column 5, Line 54, delete "arc" and insert -- are --, therefor.

In Column 6, Line 21, delete "delay," and insert -- delay; --, therefor.

In Column 6, Line 34, delete "a" before "Whenever".

In Column 6, Line 37, delete "a" before "Reduced".

In Column 8, Line 6, delete "cach" and insert -- each --, therefor.

In Column 8, Line 44, delete "please." and insert -- phase. --, therefor.

In Column 9, Lines 44-54, delete "The rate may be an explicit value.................set of sub-carriers for a user." and insert the same in Line 43, after "the rate instead." as a continuation of the paragraph.

In Column 10, Line 37, delete "arc" and insert -- are --, therefor.

In Column 11, Line 16, delete "weights" and insert -- weights. --, therefor.

In Column 13, Line 13, delete "$\phi_l$" and insert -- $\phi_i$ --, therefor.

In Column 13, Line 18, in Equation, delete "$\arg_{J_i,\Phi_i,\Psi} \left\{ opt_{J_i,\Phi_i,\Psi} \{f\} \right\}$" and insert -- $\arg_{J_i,\Phi_i,\Psi} \left\{ opt_{J_i,\Phi_i,\Psi} \{f\} \right\}$ --, therefor.

In Column 13, Line 27, in Equation, delete "$\left\{ opt_{J_i,\Phi_i,\Psi} \{f\} \right\}$" and insert -- $\left\{ opt_{J_i,\Phi_i,\Psi} \{f\} \right\}$ --, therefor.

UNITED STATES PATENT AND TRADEMARK OFFICE
CERTIFICATE OF CORRECTION

PATENT NO. : 7,545,765 B2  Page 2 of 3
APPLICATION NO. : 10/729846
DATED : June 9, 2009
INVENTOR(S) : Larsson et al.

It is certified that error appears in the above-identified patent and that said Letters Patent is hereby corrected as shown below:

In Column 13, Line 34, in Equation, delete " $\left(\underset{J_i, \Phi_i, \Psi}{opt}\{f\}\right)$ " and insert -- $\left\{\underset{J_i, \Phi_i, \Psi}{opt}\{f\}\right\}$ --, therefor.

In Column 13, Line 43, in Equation, delete " $\left(\underset{J_i, \Phi_i, \Psi}{opt}\{f\}\right)$ " and insert -- $\left\{\underset{J_i, \Phi_i, \Psi}{opt}\{f\}\right\}$ --, therefor.

In Column 13, Line 54, delete "$C^{(\Phi i)}$" and insert -- $C_i^{(\varphi i)}$ --, therefor.

In Column 13, Line 55, delete "$\phi_i \in \Phi.$" and insert -- $\varphi_i \in \Phi_i.$ --, therefor.

In Column 14, Line 12, delete "executed" and insert -- executed. --, therefor.

In Column 15, Line 55, in Equation, delete " $Z = R \cdot B \cdot lg_2\left(1 + \frac{P \cdot Const}{R^\alpha \cdot N}\right),$ " and insert -- $Z = R \cdot B \cdot lg_2\left(1 + \frac{P \cdot Const}{R^\alpha \cdot N}\right),$ --, therefor.

In Column 15, Line 59, delete "αis" and insert -- α is --, therefor.

In Column 16, Line 64, delete "fill" and insert -- full --, therefor.

In Column 17, Line 10, delete "die" and insert -- the --, therefor.

In Column 17, Line 11, delete "protocol," and insert -- protocol --, therefor.

In Column 17, Line 16, delete "ti," and insert -- $t_i$, --, therefor.

UNITED STATES PATENT AND TRADEMARK OFFICE
CERTIFICATE OF CORRECTION

PATENT NO. : 7,545,765 B2
APPLICATION NO. : 10/729846
DATED : June 9, 2009
INVENTOR(S) : Larsson et al.

It is certified that error appears in the above-identified patent and that said Letters Patent is hereby corrected as shown below:

In Column 17, Line 50, delete "Unit" and insert -- unit --, therefor.

In Column 18, Line 30, delete "die" and insert -- the --, therefor.

In Column 18, Line 63, delete "die" and insert -- the --, therefor.

In Column 18, Line 67, delete "it" and insert -- is --, therefor.

In Column 19, Line 44, delete "Tile" and insert -- The --, therefor.

In Column 21, Line 4, delete "node" and insert -- node. --, therefor.

In Column 22, Lines 5-11, delete "Yet, in reference [8], an.................opportunistic link adaptation." and insert the same in Line 3, after "transmission." as a continuation of the paragraph.

In Column 22, Line 66, delete "SNR$_k$defined" and insert -- SNR$_k$ defined --, therefor.

In Column 23, Line 30, delete "IEEE," and insert -- IEEE --, therefor.

In Column 24, Line 49, in Claim 9, delete "farther" and insert -- further --, therefor.

Signed and Sealed this

Twenty-fourth Day of November, 2009

David J. Kappos
*Director of the United States Patent and Trademark Office*